(12) United States Patent
Lee et al.

(10) Patent No.: US 11,042,284 B2
(45) Date of Patent: Jun. 22, 2021

(54) ELECTRONIC DEVICE AND METHOD FOR DISPLAYING OBJECT FOR PROVIDING SPLIT SCREEN

(71) Applicant: Samsung Electronics Co., Ltd., Suwon-si (KR)

(72) Inventors: Sangeun Lee, Suwon-si (KR); Dasom Kim, Suwon-si (KR); Sangki Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/851,442

(22) Filed: Apr. 17, 2020

(65) Prior Publication Data
US 2020/0333932 A1    Oct. 22, 2020

(30) Foreign Application Priority Data
Apr. 18, 2019   (KR) ................. 10-2019-0045770

(51) Int. Cl.
*G06F 3/0486*   (2013.01)
*G06F 1/16*     (2006.01)
(Continued)

(52) U.S. Cl.
CPC .......... *G06F 3/0486* (2013.01); *G06F 1/1652* (2013.01); *G06F 3/1431* (2013.01);
(Continued)

(58) Field of Classification Search
CPC ...... G09G 5/395; G09G 5/14; G09G 2360/04; G09G 2360/127; G09G 2380/02;
(Continued)

(56) References Cited

U.S. PATENT DOCUMENTS

2010/0088634 A1    4/2010  Tsuruta et al.
2012/0127061 A1*   5/2012  Pegg .................... G06F 1/1616
                                                    345/1.1
(Continued)

FOREIGN PATENT DOCUMENTS

JP          2001-060134 A       3/2001
KR      10-2014-0035038 A       3/2014
(Continued)

OTHER PUBLICATIONS

International Search Report dated Jul. 31, 2020, issued in International Application No. PCT/KR2020/005157.

*Primary Examiner* — Abbas I Abdulselam
(74) *Attorney, Agent, or Firm* — Jefferson IP Law, LLP

(57) ABSTRACT

An electronic device is provided. The electronic device includes a first housing including a first surface and a second surface faced away from the first surface, a second housing including a third surface and a fourth surface faced away from the third surface, a first display including a folding part rotatably connecting a side surface of the first housing and a side surface of the second housing facing the side surface of the first housing, the first display being disposed on the first surface and the third surface across the folding part, a second display disposed on the second surface of the first housing, at least one memory storing instructions, and at least one processor.

20 Claims, 19 Drawing Sheets

(51) Int. Cl.
  *G09F 9/30* (2006.01)
  *G06F 3/14* (2006.01)
  *G09G 5/395* (2006.01)
(52) U.S. Cl.
  CPC ............ *G09F 9/301* (2013.01); *G09G 5/395* (2013.01); *G06F 2203/04803* (2013.01); *G09G 2360/04* (2013.01); *G09G 2360/127* (2013.01); *G09G 2380/02* (2013.01)
(58) Field of Classification Search
  CPC . G09G 2340/04; G09F 9/301; G06F 3/04817; G06F 3/147; G06F 1/1652; G06F 3/04883; G06F 3/1431; G06F 3/1446; G06F 3/0486; G06F 2203/04803
  See application file for complete search history.

(56) References Cited

U.S. PATENT DOCUMENTS

| | | | |
|---|---|---|---|
| 2013/0305184 A1* | 11/2013 | Kim | G06F 3/0482 715/781 |
| 2014/0075389 A1 | 3/2014 | Kim | |
| 2017/0353643 A1 | 12/2017 | Tuulos et al. | |
| 2018/0308480 A1* | 10/2018 | Jang | G06F 3/0484 |
| 2020/0027425 A1 | 1/2020 | Lee et al. | |

FOREIGN PATENT DOCUMENTS

| | | |
|---|---|---|
| KR | 10-2015-0135060 A | 12/2015 |
| KR | 10-2020-0008804 A | 1/2020 |
| KR | 10-2020-0008922 A | 1/2020 |
| WO | 2016/039498 A1 | 3/2016 |
| WO | 2017/222243 A1 | 12/2017 |

* cited by examiner

ELECTRONIC DEVICE AND METHOD FOR DISPLAYING OBJECT FOR PROVIDING SPLIT SCREEN

CROSS-REFERENCE TO RELATED APPLICATION(S)

This application is based on and claims priority under 35 U.S.C. 119(a) of a Korean patent application No. 10-2019-0045770, filed on Apr. 18, 2019, in the Korean Intellectual Property Office, the disclosure of which is incorporated by reference herein in its entirety.

BACKGROUND

1 Field

The disclosure relates to an electronic device for displaying an object for providing a split screen. More particularly, the disclosure relates to a method for operating the same.

2 Description of Related Art

Recent development of digital technology is followed by widespread use of various types of electronic devices, such as a mobile communication terminal, a smartphone, a tablet, a personal computer (PC), an electronic wallet, a personal digital assistant (PDA), and a wearable device. Electronic devices for easily accessing multimedia content are being developed. Such electronic devices may provide multimedia content by using displays of the electronic devices.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide There has been increasing use of electronic devices having portability and having larger display sizes than smartphones, such as phablets and tablets. Accordingly, there is a request for a solution for simultaneously providing various kinds of information in connection with an electronic device having a larger display size than a smartphone.

Technical objectives to be accomplished in this document are not limited to the technical objectives mentioned above, and other technical objectives not mentioned herein may be clearly understood by a person skilled in the art to which the disclosure pertains from the following description.

Additional aspects will be set forth in part in the description which follows and, in part, will be apparent from the description, or may be learned by practice of the presented embodiments.

In accordance with an aspect of the disclosure, an electronic device is provided. The electronic device includes a first housing including a first surface and a second surface faced away from the first surface, a second housing including a third surface and a fourth surface faced away from the third surface, a first display including a folding part rotatably connecting a side surface of the first housing and a side surface of the second housing facing the side surface of the first housing, the first display being disposed on the first surface and the third surface across the folding part, a second display disposed on the second surface of the first housing, at least one memory configured to store instructions, and at least one processor configured, when the instructions are, to display at least a part of a first screen within a first sub region within a display region of the first display and display at least one of a second screen or a third screen within a second sub region beside the first sub region within the display region, receive a designated first input of rotating the first housing and the second housing around the folding part to contact portions of the first display, while displaying at least a part of the first screen within the first sub region and displaying at least one of the second screen or the third screen within the second sub region, display a fourth screen within the second display, in response to receiving a designated second input of activating the second display, after receiving the first input, receive a designated third input of rotating the first housing and the second housing around the folding part to separate the contacted portions of the first display, while displaying the fourth screen within the second display, display a fifth screen at least partially related to the fourth screen displayed on the second display, within the display region of the first display, in response to receiving the third input, and display an object for displaying the second sub region including at least one of the second screen or the third screen, while displaying the fifth screen.

In accordance with another aspect of the disclosure, an electronic device is provided. The electronic device includes a display, at least one memory configured to store instructions, and at least one processor configured, when the instructions are executed, to display at least a part of a first screen within a first sub region within a display region of the display and display at least one of a second screen or a third screen within a second sub region beside the first sub region within the display region, receive a designated first input while displaying at least a part of the first screen within the first sub region and displaying at least one of the second screen or the third screen within the second sub region, display an object for displaying the second sub region and a fourth screen distinguished from the first screen, the second screen, and the third screen in the entire display region, in response to receiving the first input, and display a fifth screen based on the fourth screen within the first sub region and display the second screen or the third screen within the second sub region, in response to receiving a designated second input of selecting the object.

In accordance with another aspect of the disclosure, a method of an electronic device is provided. The method includes displaying at least a part of a first screen within a first sub region within a display region of a first display of the electronic device, displaying at least one of a second screen or a third screen within a second sub region beside the first sub region while displaying at least a part of the first screen within the first sub region, receiving a designated first input of rotating a first housing and a second housing of the electronic device around a folding part of the electronic device to contact portions of the first display, while displaying at least a part of the first screen within the first sub region and displaying at least one of the second screen or the third screen within the second sub region, displaying a fourth screen within the second display, in response to receiving a designated second input of activating the second display of the electronic device, after receiving the first input, receiving a designated third input of rotating the first housing and the second housing around the folding part to separate the contacted portions of the first display, while displaying the fourth screen within the second display, displaying a fifth screen at least partially related to the fourth screen displayed within the second display, within the display region of the first display, in response to receiving the third input, and displaying an object for displaying the second sub region including at least one of the second screen or the third screen, while displaying the fifth screen.

An electronic device and a method for operating the same, according to various embodiments of the disclosure, provides a split screen or displays an object for providing a split screen, thereby providing an enhanced user experience.

Other aspects, advantages, and salient features of the disclosure will become more apparent to those skilled in the art from the following detailed description, which, taken in conjunctions with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
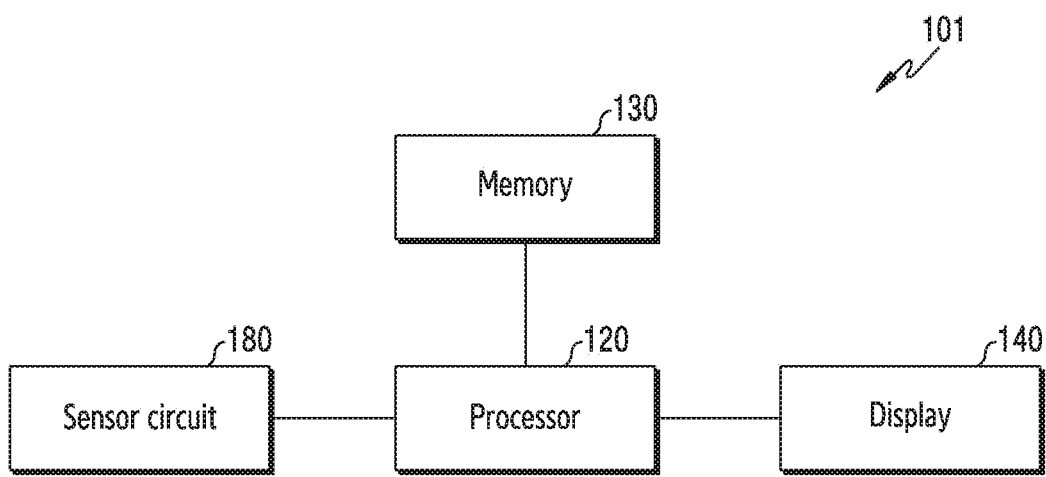
FIG. 1A illustrates a functional configuration of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described with reference to the accompanying drawings. However, it should be understood that they are not intended to limit the technological features set forth herein to particular embodiments and the disclosure includes various changes, equivalents, or alternatives for the embodiments of the disclosure. With regard to the description of the drawings, similar reference numerals may be used to designate similar or relevant elements.

As used herein, the expression "have", "may have", "include", or "may include" refers to the existence of a corresponding feature (e.g., a numeral, a function, an operation, or a constituent element, such as a component) and does not exclude the existence of additional features.

As used herein, the expression "A or B", "at least one of A and/or B", or "one of more of A and/or B" may include all possible combinations of items enumerated together. For example, "A or B", "at least one of A and B", or "at least one of A or B" may refer to all of (1) including at least one A, (2) including at least one B, or (3) including all of at least one A and at least one B.

The expressions "a first", "a second", "the first", "the second", and the like as used in various embodiments may modify various elements regardless of the order and/or the importance thereof, and does not limit the corresponding elements. These expressions may be used to distinguish between one element and any other element. For example, a first element may be termed a second element, and similarly, a second element may be termed a first element without departing from the scope of the disclosure.

It should be understood that when an element (e.g., a first element) is referred to as being (operatively or communicatively) "connected," or "coupled," to another element (e.g., a second element), it may be directly connected or coupled directly to the other element or any other element (e.g., a third element) may be interposer between them. In contrast, it could be understood that when an element (e.g., the first element) is referred to as being "directly connected," or "directly coupled" to another element (second element), there are no element (e.g., the third element) interposed between them.

The expression "configured to" used in the disclosure may be interchangeably used with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted to (or configured) to perform A, B, and C" may mean a dedicated processor (e.g., an embedded processor) only for performing the corresponding operations or a generic-purpose processor (e.g., a central processing unit (CPU) or application processor (AP)) that can perform the corresponding operations by executing one or more software programs stored in a memory device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of, for example, a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group (MPEG-1 or MPEG-2) audio layer-3 (MP3) player, a mobile medical device, a camera, and a wearable device. The wearable device may include at least one of an accessory type (e.g., a watch, a ring, a bracelet, an anklet, a necklace, glasses, contact lens, or a head-mounted device (HMD)), a fabric or clothing-integrated type (e.g., an electronic clothing), a body-mounted type (e.g., skin pad, or tattoo), and a bio-implantable type (e.g., implantable circuit).

According to some embodiments of the disclosure, the electronic device may include at least one of, for example, a television, a digital video disk (DVD) player, an audio, a refrigerator, an air conditioner, a vacuum cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to other embodiments of the disclosure, the electronic device may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, an automatic teller's machine (ATM) in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.).

According to some embodiments of the disclosure, the electronic device may include at least one of a part of furniture or a building/structure, an electronic board, an electronic signature receiving device, a projector, and various kinds of measuring instruments (e.g., water meter, electric meter, gas meter, radio wave meter, etc.). In various embodiments of the disclosure, the electronic device may be flexible, or may be a combination of one or more of the aforementioned various devices. According to some embodiments of the disclosure, the electronic device may be a flexible electronic device or foldable electronic device. Further, the electronic device according to various embodiments of the disclosure is not limited to the aforementioned devices, and may include a new electronic device according to the development of technology.

As used herein, the term "user" may refer to a person using an electronic device or a device (e.g., artificial intelligence electronic device) using an electronic device.

Hereinafter, various embodiments of the disclosure will be described with reference to the accompanying drawings. In the accompanying drawings, the sizes of some elements may be exaggerated or reduced for the convenience of description. For example, the size and thickness of each element are arbitrarily illustrated for the convenience of description, and thus the disclosure is not limited by the illustrated size and thickness.

Figure 1B:
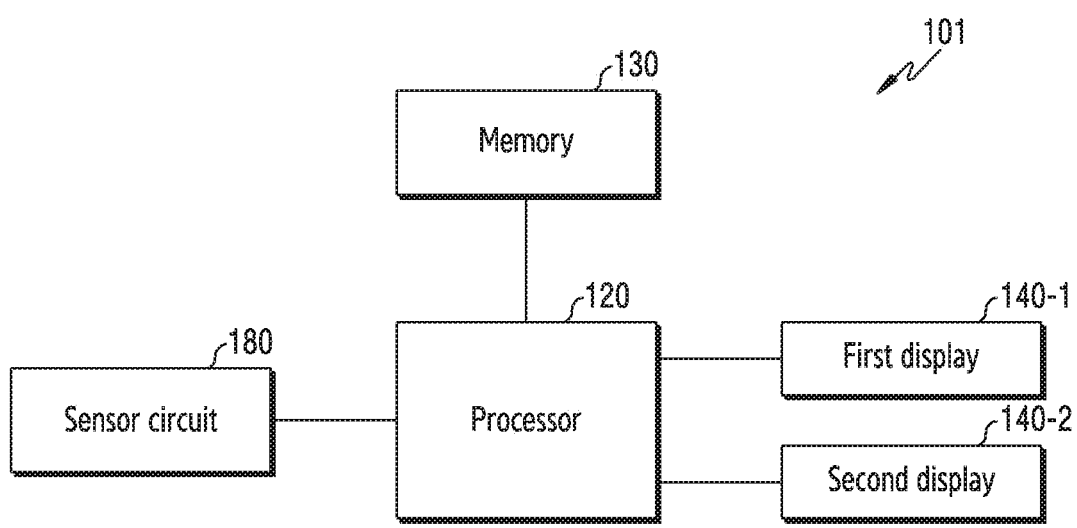
FIG. 1B illustrates an functional configuration of an electronic device according to an embodiment of the disclosure.

FIG. 1A illustrates a functional configuration of an electronic device according to an embodiment of the disclosure, and FIG. 1B illustrates a functional configuration of an electronic device according to an embodiment of the disclosure.

Referring to FIG. 1A, an electronic device 101 may include a processor 120, a memory 130, a display 140, and a sensor circuit 180.

The processor 120 may control overall operations of the electronic device 101. For example, the processor 120 may execute applications that provide advertisements, the Internet, games, moving images, and the like. In various embodiments of the disclosure, the processor 120 may include a single processor core or may include multiple processor cores. For example, the processor 120 may include a multi-core, such as a dual-core, a quad-core, or a hexa-core. According to embodiments of the disclosure, the processor 120 may further include a cache memory positioned inside or outside the same. The processor 120 may receive a command from other elements of the electronic device 101, may interpret the received command, and may perform calculation or process data according to the interpreted command The processor 120 may process data or signals produced or generated in an application. For example, the processor 120 may request the memory 130 to provide an instruction, data, or a signal in order to execute or control an application. The processor 120 may record (or store) or update an instruction, data, or a signal in the memory 130 in order to execute or control an application.

The processor 120 may interpret a message, data, an instruction, or a signal received from the memory 130, the display 140, or the sensor circuit 180, and may process the same. The processor 120 may produce a new message, data, instruction, or signal based on the received message, data, instruction, or signal. The processor 120 may provide a processed or produced message, data, instruction, or signal to the memory 130, the display 140, or the sensor circuit 180.

All or part of the processor 120 may be electrically, operably, or operatively coupled with or connected to a different element inside the electronic device 101 (for example, the memory 130, the display 140, or the sensor circuit 180). The electronic device 101 according to an embodiment may further include a communication bus (not illustrated) in order to electrically connect the processor 120, the memory 130, the display 140, and the sensor circuit 180.

According to embodiments of the disclosure, the processor 120 may be configured with one or more processors. For example, the processor 120 may include at least one of an application processor (AP) configured to control an upper-layer program, such as an application program, a graphic processing unit (GPU) for controlling the display 140, or a communication processor (CP) for controlling a communication function.

The memory 130 may store an instruction for controlling the electronic device 101, a control instruction code, control data, or user data. For example, the memory 130 may include an application, an operating system (OS), middleware, or a device driver.

The memory 130 may store an instruction related to an application and an instruction related to an operating system (OS). The operating system refers to system software executed by the processor 120. By executing the OS, the processor 120 may manage hardware components included in the electronic device 101. The OS may provide an application programming interface (API) as an application which corresponds to software other than the system software.

At least one application, each of which corresponds to a set of multiple instructions, may be installed in the memory 130. The description that an application is installed in the memory 130 means that the application is stored therein in such a format that the same can be executed by the processor 120 connected to the memory 130. While multiple applications are installed in the memory 130, the processor 120 may simultaneously execute at least two among the multiple applications. For example, the processor 120 may simultaneously execute at least two applications based on multitasking.

According to embodiments of the disclosure, the memory 130 may be configured with one or more memories. For example, the memory 130 may include at least one of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), or the like. The non-volatile memory may include a read only memory (ROM), a programmable ROM (PROM), an electrically programmable ROM (EPROM), an electrically erasable programmable ROM (EEPROM), a flash memory, or the like.

The memory 130 may include a non-volatile medium, such as a hard disk drive (HDD), a solid state disk (SSD), an embedded multimedia card (eMMC), or a universal flash storage (UFS).

The memory 130 may include a graphic random access memory (GRAM). The processor 120 according to an embodiment may store frame data related to a screen to be displayed on the display 140 in the GRAM.

The display 140 may output contents, data, or signals. In various embodiments of the disclosure, the display 140 may display frame data processed by the processor 120. The display 140 may display the frame data based on multiple pixels. The display 140 may include at least one circuit (for example, display driver circuit (DDIC)) for controlling the color and/or brightness of the multiple pixels. By scanning the frame data in the GRAM included in the memory 130, the at least one DDIC included in the display 140 may control the color and/or brightness of the multiple pixels and then display the frame data.

According to embodiments of the disclosure, the display 140 may be coupled with multiple touch sensors (not illustrated) capable of receiving touch inputs and the like, and thus may be configured with an integrated touch screen. When the display 140 is configured with a touch screen, the multiple touch sensors may be disposed over the display 140 or below the display 140.

According to embodiments of the disclosure, the display 140 may be configured with a display (for example, foldable display) such that at least a part of the display 140 is foldable. When the display 140 is configured with a foldable display, the electronic device 101 may have a such structure that the display 140 is foldable. The structure and/or operation of the electronic device 101, which makes the display 140 foldable, will be described with reference to FIG. 2B, FIG. 6 to FIG. 7, FIG. 8A to FIG. 8B, and FIG. 10.

According to embodiments of the disclosure, the number of displays 140 included in the electronic device 101 may vary. Referring to FIG. 1B, the electronic device 101 according to an embodiment may include a first display 140-1 and a second display 140-2. At least one of the first display 140-1 and the second display 140-2 may be configured with a flexible display, at least a part of which is foldable. DDICs included in the first display 140-1 and the second display 140-2, respectively, may share the GRAM included in the memory 140. In connection with the electronic device 101 including the first display 140-1 and the second display 140-2, the processor 120 may selectively activate and/or selectively control one of the first display 140-1 and the second display 140-2.

In an embodiment of the disclosure, the processor 120 may selectively activate and/or selectively control one of the first display 140-1 and the second display 140-2, based on the type of the electronic device 101 and/or the type of the first display 140-1 and/or the second display 140-2 corresponding to a flexible display. Operations of the processor 120, which is operatively connected to the first display 140-1 and the second display 140-2, controlling the electronic device 101 based on the type of the electronic device 101 will be described with reference to FIG. 2B, FIG. 6 to FIG. 7, and FIG. 8A to FIG. 8B.

Figure 2A:
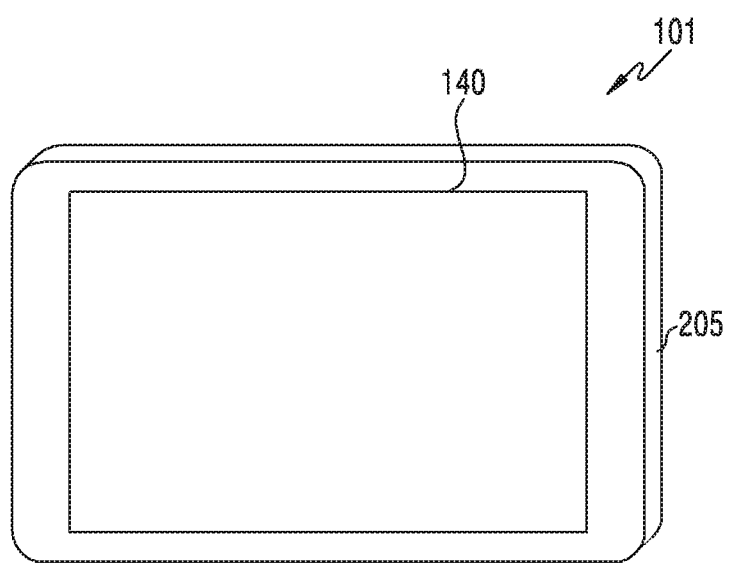
FIG. 2A illustrates an appearance of an electronic device according to an embodiment of the disclosure.
Figure 2B:
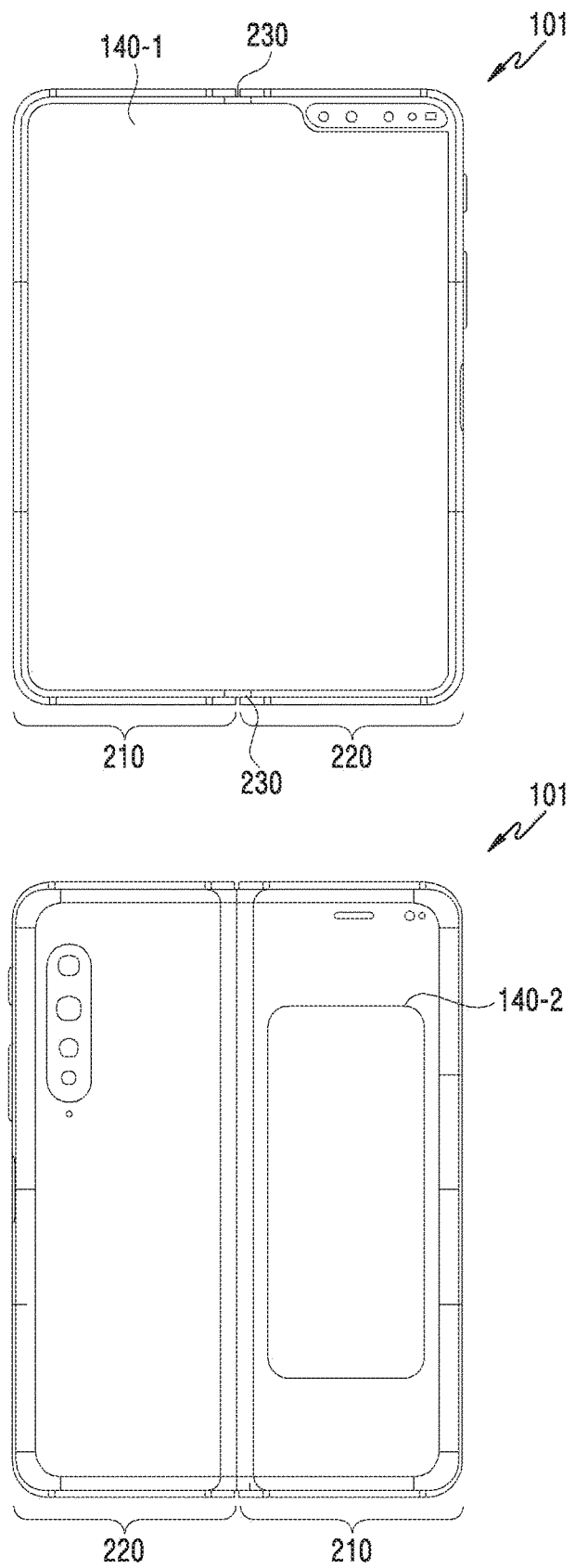
FIG. 2B illustrates an appearance of an electronic device according to an embodiment of the disclosure.

FIG. 2A illustrates an appearance of an electronic device according to an embodiment of the disclosure, and FIG. 2B illustrates an appearance of an electronic device according to an embodiment of the disclosure. The electronic device 101 in FIG. 2A to FIG. 2B may correspond to the electronic device 101 in FIG. 1A to FIG. 1B. The appearance of the electronic device 101 may be related to at least one housing having various types. Referring to FIG. 2A, the electronic device 101 may include a housing 205. Inside the housing 205, for example, the processor 120, the memory 130, and the sensor circuit 180 illustrated in FIG. 1A may be disposed. Referring to FIG. 2A, at least a part of the display 140 may be exposed through at least one surface (for example, front surface) of the housing 205.

Referring to FIG. 2A, the electronic device 101 may include at least one of a first housing 210, a second housing 220, a folding part 230, a first display 140-1, or a second display 140-2. In various embodiments of the disclosure, the first housing 210 may include a first surface and a second surface faced away from the first surface. In various embodiments of the disclosure, the second housing 220 may include a third surface and a fourth surface faced away from the third surface.

In various embodiments of the disclosure, the first housing 210 and the second housing 220 may be connected by the folding part 230. For example, the folding part 230 may be coupled to a side surface of the first housing 210 and to a side surface of the second housing 220, which faces the side surface of the first housing 210, respectively, so as to pivotably or rotatably connect between the first housing 210 and the second housing 220.

The first display 140-1 may be disposed on the first housing 210 and the second housing 220 across the folding part 230. In various embodiments of the disclosure, the first display 140-1 may be installed to be supported by the first housing 210 and the second housing 220. In various embodiments of the disclosure, the first display 140-1 may be disposed on the first surface and the third surface across the folding part 230. In various embodiments of the disclosure, the first display 140-1 may include a first region corresponding to the first surface and a second region corresponding to the third surface.

The electronic device 101 according to various embodiments may be folded with reference to the folding part 230. For example, the folding part 230 may be disposed between the first housing 210 and the second housing 220 of the electronic device 101 such that the electronic device 101 can be bent, curved, or folded. In various embodiments of the disclosure, the first housing 210 may be connected to the second housing 220 through the folding part 230 to be able to rotate with reference to the folding part 230. In various embodiments of the disclosure, the second housing 230 may be connected to the first housing 210 through the folding part 230 to be able to rotate with reference to the folding part 230. In various embodiments of the disclosure, the first housing 210 and the second housing 220 may rotate with reference to the folding part 230 to be folded while facing each other. In various embodiments of the disclosure, the first housing 210 and the second housing 220 may be substantially overlapped or superimposed on each other. In an embodiment of the disclosure, the first display 140-1 may be configured with a flexible display, and may be bent, curved, and/or folded as the electronic device 101 is folded.

In various embodiments of the disclosure, the electronic device 101 may provide a first state in which the first housing 210 and the second housing 220 are folded out by the folding part 230. In various embodiments of the disclosure, in the first state, the first surface may be substantially flush with the third surface. In various embodiments of the disclosure, by folding out the folding part 230, the electronic device 101 may provide the first state in which the first housing 210 and the second housing 220 are substantially flush with each other. In various embodiments of the disclosure, the first state may refer to such a state that, within the field of view (or angle of view) of the user facing the front surface of the electronic device 101, a first region corresponding to the first surface in the entire area of the first display 140-1, a second region corresponding to the third surface in the entire area of the first display 140-1, and a third region surrounding the folding part 230 in the entire area of the first display 140-1 can all be provided. In various embodiments of the disclosure, the first state may be referred to as an outspread state, an outspreading state, or an unfolding state.

In various embodiments of the disclosure, the electronic device 101 may provide a second state in which the first housing 210 and the second housing 220 are folded in by the folding part. In various embodiments of the disclosure, in the second state, the first surface may be superimposed on the third surface (for example, in-folding). In various embodiments of the disclosure, the electronic device 101 may provide the second state in which the folding part 230 is folded such that the front surface (for example, the first surface) of the first housing 210 and the front surface (for example, the third surface) of the second housing 220 face each other, and the first housing 210 and the second housing 220 are accordingly disposed in parallel with each other. In various embodiments of the disclosure, the second state may refer to a state wherein, within the field of view of the user facing the front surface of the electronic device 101, the first display 140-1 is covered. In various embodiments of the disclosure, the second state may be referred to as a folded state or a folding state.

In an embodiment of the disclosure, the second state may refer to a state in which the rear surface (for example, the second surface) of the first housing 210 and the rear surface (for example, the fourth surface) of the second housing 220 are folded to face each other (for example, out-folding). In an embodiment of the disclosure, the second state may refer to a state wherein, within the field of view of the user facing the front surface of the electronic device 101, at least a part of the first display 140-1 (for example, a part of the first display 140-1 corresponding to the first surface of the first housing 210) is not provided concurrently with the remaining part of the first display 140-1 (for example, a part of the first display 140-1 corresponding to the third surface of the second housing 220), or to a state wherein the remaining part is covered by the at least one part.

In various embodiments of the disclosure, the first display 140-1 may be disposed on the front portion (for example, the third surface) of the second housing 220 across the first housing 210 and the folding part 230. The electronic device 101 according to various embodiments may be folded with reference to the folding part 230. The first display 140-1 is disposed from the first housing 210 to the second housing 220 across the folding part 230 and thus can be bent by a folding operation of the electronic device 101. For example, in connection with the first display 140-1, the third region disposed over folding part 230 may be bent according to a folding operation of the electronic device 101, unlike the first region disposed on the first surface of the housing 210 and the second region disposed on the third surface of the second housing 220. In various embodiments of the disclosure, the third region may be bent in a curved shape to prevent the first display 140-1 from being broken.

In various embodiments of the disclosure, at least one of the first region or the second region may further include a curved region, such as the third region. For example, an end facing away from the center portion of the first housing 210 may include a round-shaped region. As another example, an end facing away from the center portion of the second housing 220 may include a round-shaped region. In various embodiments of the disclosure, the curved display region included in the first region and the curved display region included in the second region are disposed on ends of the first housing 210 and the second housing 220, respectively, and thus may be referred to as edge displays.

The sensor circuit (for example, the sensor circuit 180 in FIG. 1A to FIG. 1B) may include at least one of a first sensor for acquiring information regarding the posture of the electronic device 101 or a second sensor for acquiring information regarding the angle between the first housing 210 and the second housing 220 of the electronic device 101.

In various embodiments of the disclosure, the first sensor may include at least one of a sensor for acquiring data regarding a change in the linear movement of the electronic device 101, a sensor for acquiring data regarding a change in the rotational movement of the electronic device 101, or a sensor for acquiring data regarding the geographical position of the electronic device 101. For example, the first sensor may include at least one of a geomagnetic sensor, a gyro sensor, or an infrared sensor.

In various embodiments of the disclosure, in order to provide information regarding the state of the electronic device 101 (for example, the first state and the second state), the second sensor may acquire information regarding the angle between the first housing 210 and the second housing 220 of the electronic device 101. In various embodiments of the disclosure, the second sensor may be included in the folding part 230. An operation of the electronic device 101 according to an embodiment identifying and/or switching the state of the electronic device 101 based on the angle between the first housing 210 and the second housing 220 will be described with reference to FIG. 6.

As described above, the number of displays 140 included in the electronic device 101 may vary according to embodiments. Referring to FIG. 2B, the electronic device 101 may further include a second display 140-2 distinguished from the first display 140-1. The second display 140-2 may be disposed on a different surface (for example, the second surface of the first housing 210) distinguished from at least one surface of the first housing 210 and the second housing 220, on which the first display 140-1 is disposed. The sizes, pixel densities (for example, pixels-per-inch (PPI)), and/or resolutions of the first display 140-1 and the second display 140-2 may be independent of each other.

In various embodiments of the disclosure, the processor (for example, the processor 120 in FIG. 1A to FIG. 1B) may display various kinds of information by using at least one display (for example, the display 140 in FIG. 2A, the first display 140-1 and/or the second display 140-2 in FIG. 2B) included in the electronic device 101. The information displayed by using at least one display may be related to at least one application currently executed by the processor. For example, the electronic device 101 may display the information and/or may display an execution screen and/or a user interface (UI) for receiving information from the user of the electronic device 101, in at least a part of the display region of the display, based on the operating system and/or at least one application currently executed by the processor.

In various embodiments of the disclosure, the information may be displayed in at least one of a first region, a second region below the first region, or a third region above the first region, within the display region of the at least one display. In various embodiments of the disclosure, the second region may include at least one executable object for controlling the screen displayed in the first region (for example, an executable object for providing a backward-moving function, an executable object for checking the currently executed application, an executable object for providing a cancel function, or the like). In various embodiments of the disclosure, the at least one executable object displayed in the second region may disappear according to at least one of the type of the screen displayed within the first region or the type of contents provided through the screen displayed within the first region. In various embodiments of the disclosure, the at least one executable object displayed within the second region may be maintained independently from switching of the screen displayed within the first region, or regardless of switching of the screen displayed within the first region. In various embodiments of the disclosure, the second region may be referred to as a control region.

In various embodiments of the disclosure, the third region may include at least one indicator for indicating the state of the electronic device 101 (for example, an indicator for indicating the quality of cellular communication, an indicator for indicating whether or not the Wi-Fi function is activated, an indicator for indicating the amount of power remaining in the battery, or the like). In various embodiments of the disclosure, the at least one indicator displayed within the third region may disappear according to at least one of the type of the screen displayed within the first region or the type of contents displayed through the screen within the first region. In various embodiments of the disclosure, the at least one indicator displayed within the third region may be maintained independently from switching of the screen displayed within the first region, or regardless of switching of the screen displayed within the first region.

In various embodiments of the disclosure, the first region may display a split screen. Hereinafter, a split screen displayed by an electronic device 101 according to an embodiment within a display area of at least one display (for example, in the first region) will be described with reference to FIG. 3.

Figure 3:
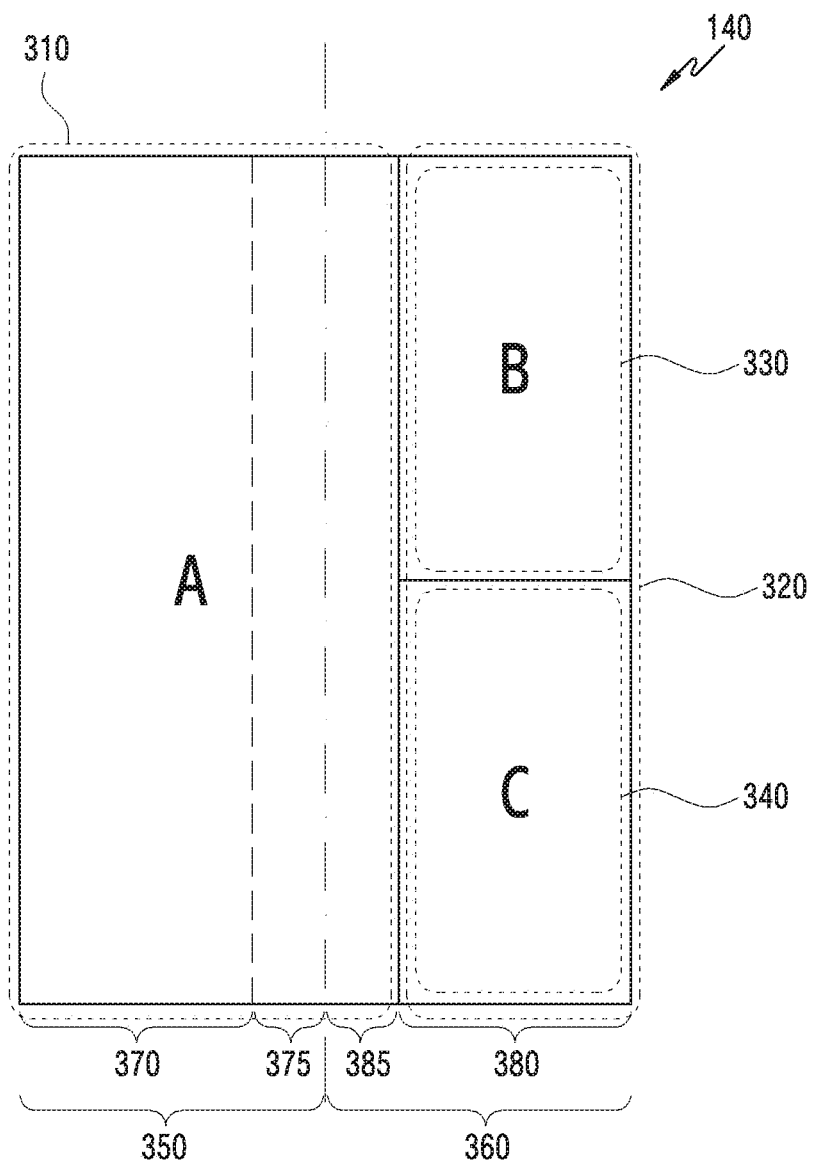
FIG. 3 illustrates a structure of a split screen displayed in an electronic device according to an embodiment of the disclosure.

FIG. 3 illustrates a structure of a split screen displayed in an electronic device according to an embodiment of the disclosure. The electronic device in FIG. 3 may display the split screen inside the display 140. The electronic device in FIG. 3 may correspond to the electronic device 101 in FIG. 1A to FIG. 1B or FIG. 2A to FIG. 2B. The display 140 in FIG. 3 may correspond to the display 140 in FIG. 1A and FIG. 2A, or may correspond to at least one of the first display 140-1 and/or the second display 140-2 in FIG. 1B and FIG. 2B.

Referring to FIG. 3, at least a part of the display region (for example, the first region) may be configured with a first sub region 310 and a second sub region 320, or may include a first sub region 310 and a second sub region 320. In various embodiments of the disclosure, the second sub region 320 may be disposed beside the first sub region 310. In various embodiments of the disclosure, the area of the second sub region 320 may be smaller than the area of the first sub region 310. However, this is not limiting in any manner In various embodiments of the disclosure, the split screen may refer to a state in which multiple screens are provided concurrently or together. Each of the multiple screens may correspond to each of multiple execution screens provided independently by at least one application and/or operating system. For example, the electronic device may display multiple execution screens provided by multiple applications included in the electronic device, respectively, on the multiple screens, respectively. For example, the electronic device may display an independent execution screen within different parts of the display, based on an application capable of producing multiple independent processes based on a multi-instance mode. In an embodiment of the disclosure, at least one of the multiple screens may include a UI provided by the operating system installed in the electronic device (for example, a menu for selecting an application to be executed within the screen).

The area of the first sub region 310 defined while the split screen is provided is larger than the area of the second sub region 320 such that the user can recognize more intuitively which region is the main region while the split screen is provided. The electronic device 101 according to various embodiments may provide an enhanced user experience through such intuitive recognition. As described above, in various embodiments of the disclosure, the area of the first sub region 310 may be larger than the area of the second sub region 320. In various embodiments of the disclosure, the first sub region 310 provides an area larger than the area of the second sub region 320 and, in this aspect, may be referred to as a main display region.

In various embodiments of the disclosure, the second sub region 320 provides an area smaller than the area of the first sub region 310 and, in this aspect, may be referred to as an auxiliary display region or an additional display region. The second sub region 320 may provide a single screen or may provide multiple screens, according to the setting or configuration of the electronic device 101. For example, the second sub region 320 may provide a second screen 330 and a third screen 340 while a first screen is provided in the first sub region 310. In various embodiments of the disclosure, the third screen 340 may be disposed below the second screen 330.

In various embodiments of the disclosure, when the display 140 is configured with a foldable display (for example, the first display 140-1 in FIG. 2B), the first region may be configured with multiple parts. For example, when the display 140 is configured with a foldable display, the first region may be configured with a part 350 corresponding to the first surface of the first housing (for example, the first housing 210 in FIG. 2B) of the electronic device and a part 360 corresponding to the third surface of the second housing (for example, the second housing 220 in FIG. 2B), or may include the part 350 and the part 360. In various embodiments of the disclosure, the part 350 may include a first part 370 disposed above the first surface of the first housing and a second part 375 disposed above the first surface, beside the first part 370, and above at least a part of the folding part (for example, the folding part 130 in FIG. 2B), or may be configured with the first part 370 and the second part 375. In various embodiments of the disclosure, the part 360 may include a third part 380 disposed above the third surface of the second housing and a fourth part 385 disposed above the third surface, beside the third part 380, and above at least a part of the folding part, or may be configured with the third part 380 and the fourth part 385.

In various embodiments of the disclosure, while the electronic device 101 provides the split screen, the first sub region 310 and the second sub region 320 may provide different screens. Hereinafter, operations of an electronic device 101 according to various embodiments providing different screens based on multiple sub regions will be described with reference to FIG. 4A to FIG. 4E.

Figure 4A:
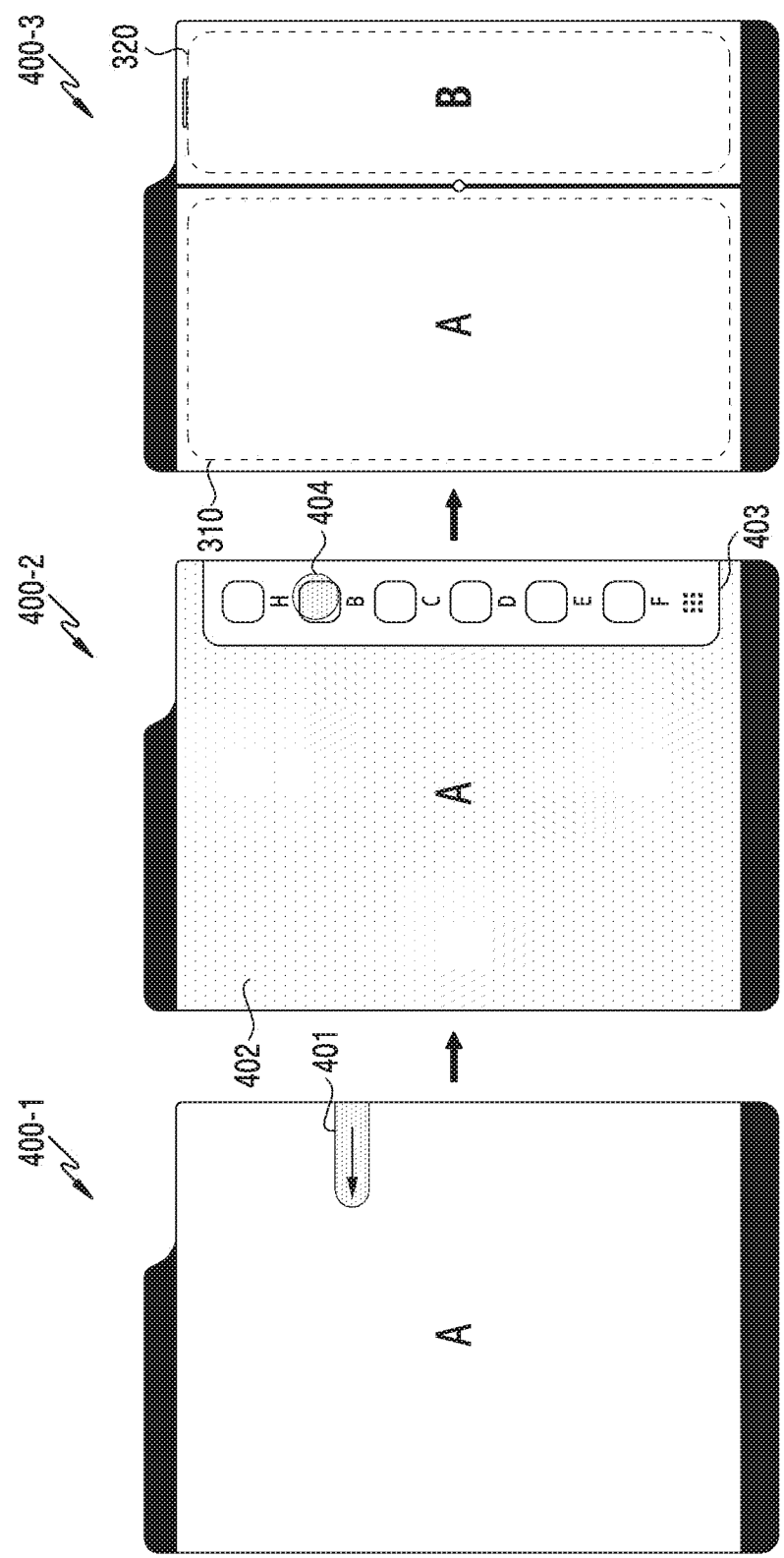
FIG. 4A illustrates a split screen displayed in an electronic device according to an embodiment of the disclosure.
Figure 4B:
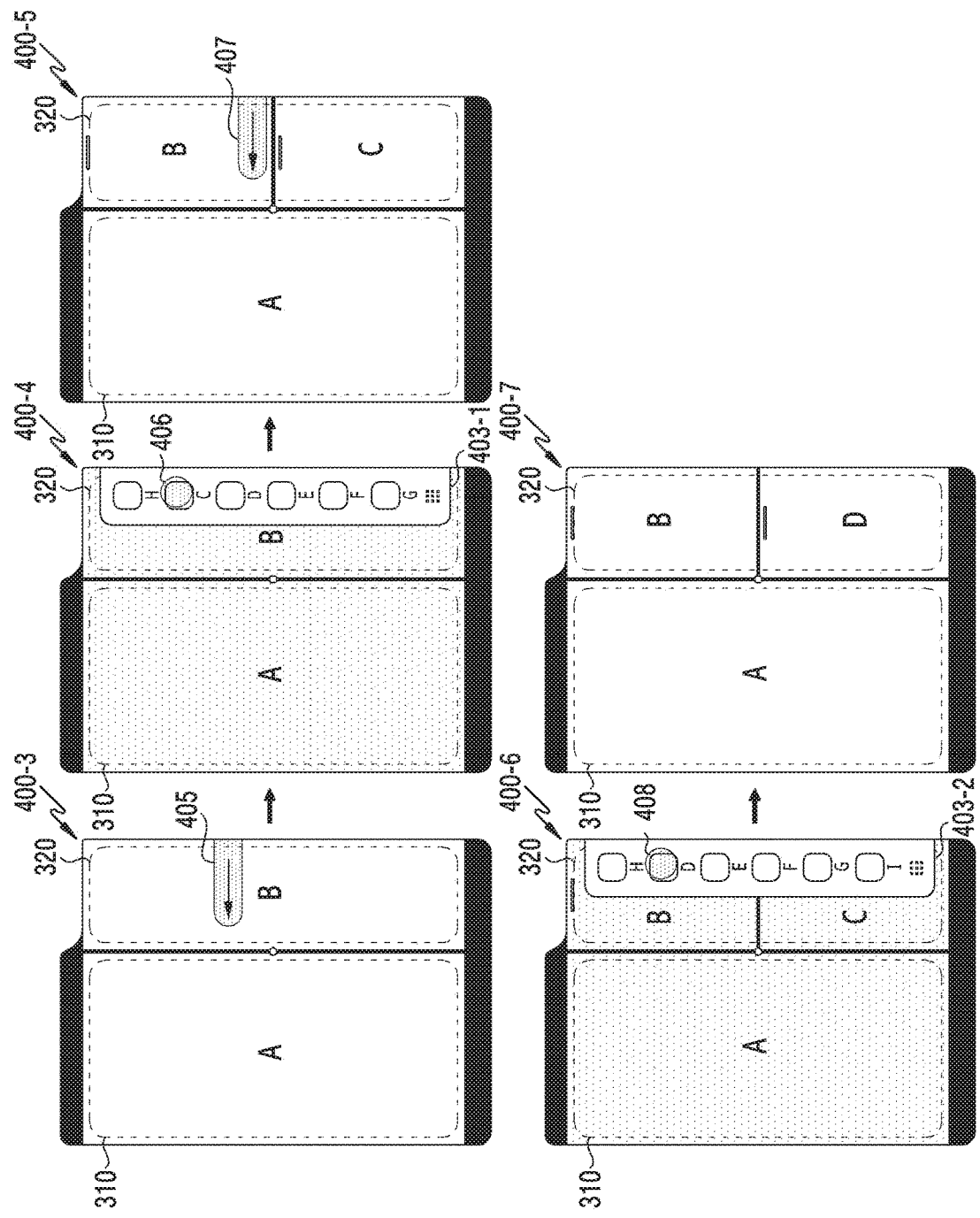
FIG. 4B illustrates a split screen displayed in an electronic device according to an embodiment of the disclosure.
Figure 4C:
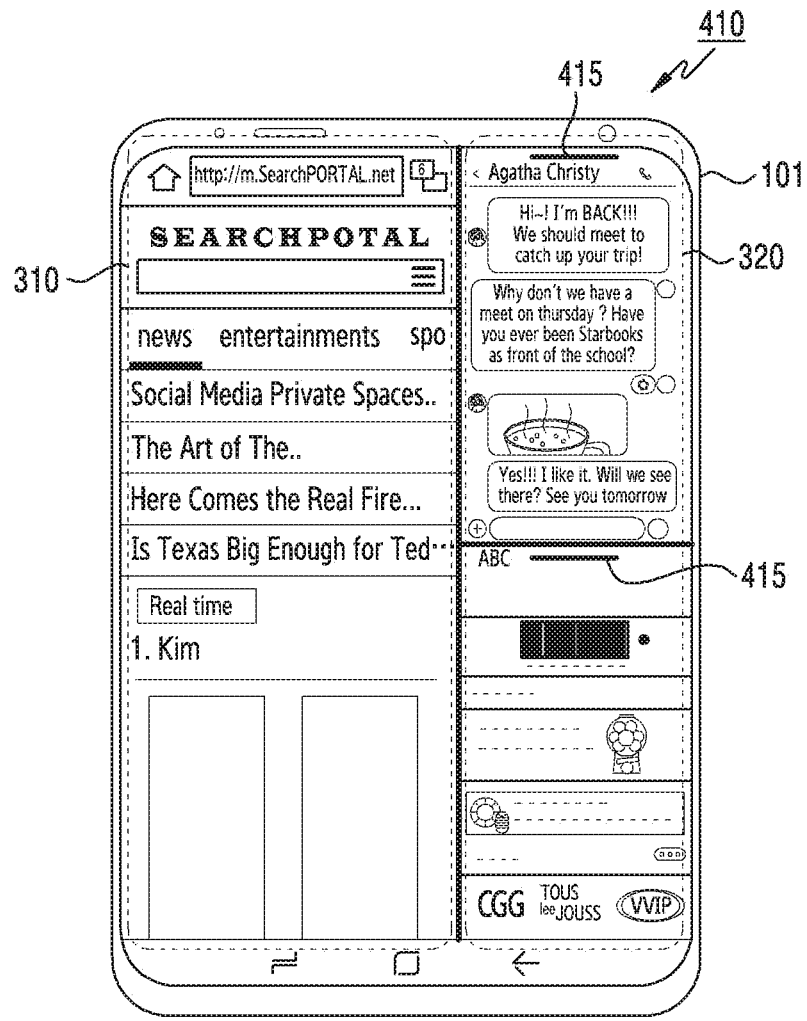
FIG. 4C illustrates a split screen displayed in an electronic device according to an embodiment of the disclosure.
Figure 4D:
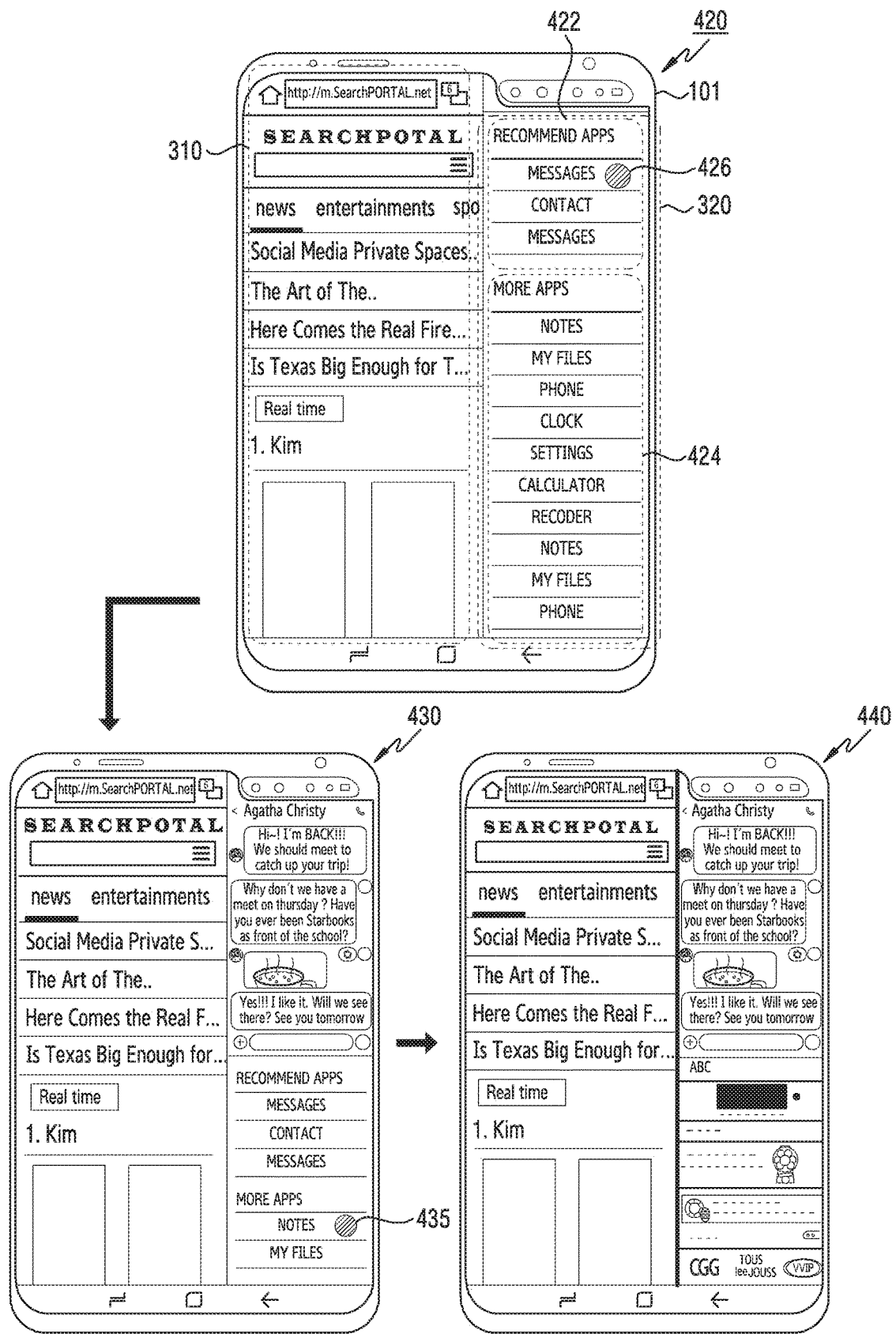
FIG. 4D illustrates a split screen displayed in an electronic device according to an embodiment of the disclosure.
Figure 4E:
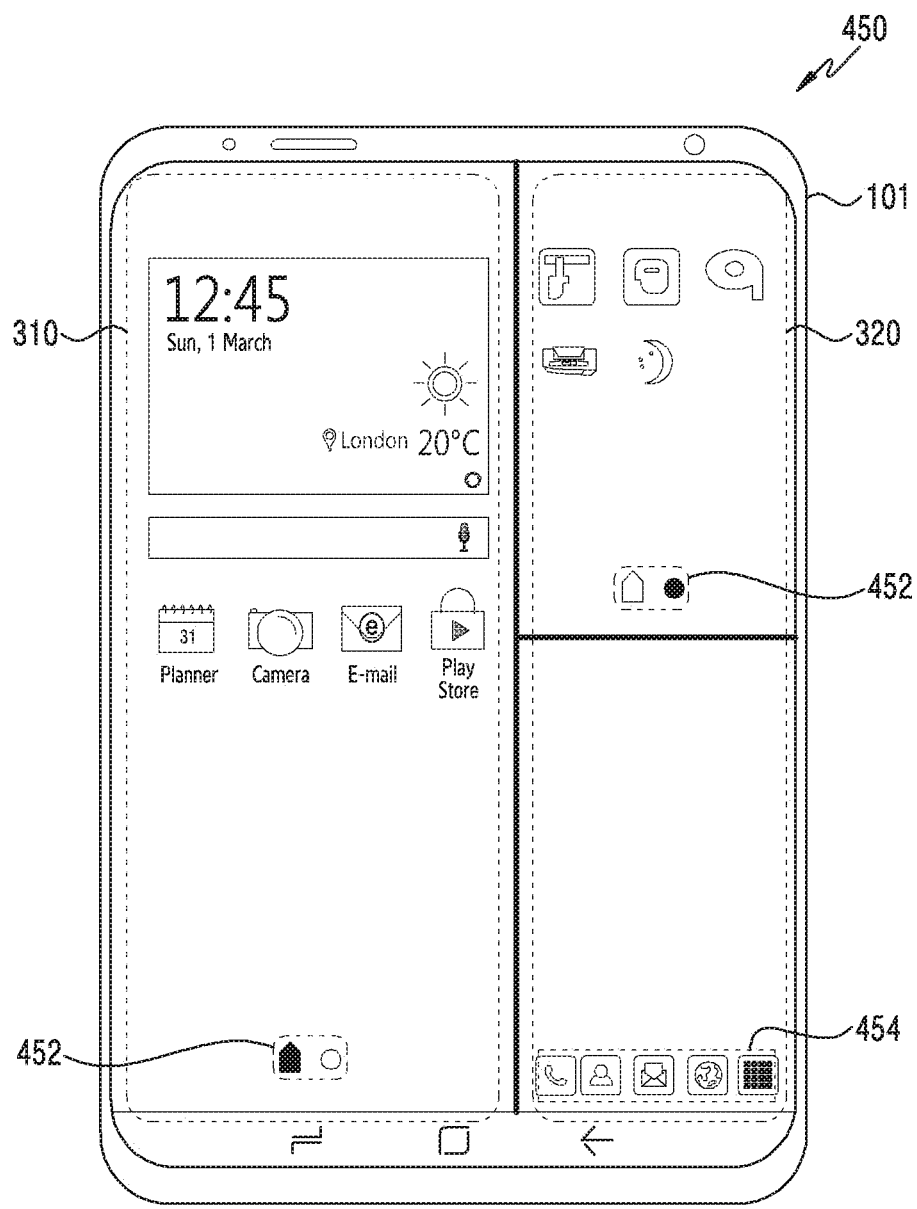
FIG. 4E illustrates a split screen displayed in an electronic device according to an embodiment of the disclosure.

FIG. 4A illustrates a split screen displayed in an electronic device according to an embodiment of the disclosure, FIG. 4B illustrates a split screen displayed in an electronic device according to an embodiment of the disclosure, FIG. 4C illustrates a split screen displayed in an electronic device according to an embodiment of the disclosure, FIG. 4D illustrates a split screen displayed in an electronic device according to an embodiment of the disclosure, and FIG. 4E illustrates a split screen displayed in an electronic device according to an embodiment of the disclosure. The electronic device 101 in FIG. 4A to FIG. 4E may correspond to the electronic device 101 in FIG. 1A to FIG. 1B and/or FIG. 2A to FIG. 2B. The electronic device 101 in FIG. 4A to FIG. 4E may simultaneously display multiple execution screens identified from multiple applications within the display, based on the split screen in FIG. 3.

Referring to FIG. 4A, in a state 400-1, the electronic device according to an embodiment may display a first screen A in the entire first region which includes a first sub region 310 and a second sub region 320, or which is configured with a first sub region 310 and a second sub region 320, while the display (for example, the display 140 in FIG. 2A) remains in an unfolded state.

The electronic device according to an embodiment may receive a designated input while displaying the first screen in the entire first region. In various embodiments of the disclosure, the designated input may include an input for entering a split screen state for simultaneously providing multiple screens on the display. In various embodiments of the disclosure, the designated input may include an input for calling a list for selecting another screen to be provided together with the first screen in the split screen state. For example, the designated input may include a drag input 401 directed from an edge region within the first region toward another region within the first region, which is different from the edge region.

The electronic device according to an embodiment may display the list as partially superimposed on the first screen or in an overlay state, in response to receiving the designated input. For example, the list may include at least one visual object for indicating some of applications that have been executed within the second sub region.

Referring to FIG. 4A, in the state 400-1, the electronic device according to an embodiment may receive, as the designated input, a drag input 401 directed from an edge region within the first region toward another region within the first region, which is different from the edge region, while displaying the first screen in the entire first region. The electronic device according to an embodiment may switch the state 400-1 to a state 400-2 in response to receiving the drag input 401.

In the state 400-2, the electronic device according to an embodiment may display a shaded region 402 over the first screen A, in order to indicate that the state of the electronic device 101 corresponds to a state in which another screen to be provided together with the first screen A in the split screen state can be selected. Alternatively, unlike the state 400-2, the electronic device according to an embodiment may blur the first screen A, in order to indicate that the state of the electronic device 101 corresponds to a state in which another screen to be provided together with the first screen A in the split screen state can be selected.

The electronic device according to an embodiment may display a list 403 as partially superimposed over the second sub region 320, in the state 400-2. In various embodiments of the disclosure, the list 403 may include at least one executable object. In various embodiments of the disclosure, the at least one executable object may indicate some of applications that have been executed within the second sub region 320. In various embodiments of the disclosure, at least some of the at least one executable object may be replaced with at least one different executable object, based on an input for scrolling the list 403. For example, the electronic device according to an embodiment may display, based on the input for scrolling the list 403, the at least one different executable object indicating other ones of the applications that have been executed within the second sub region 320, within the list 403.

In various embodiments of the disclosure, the order of identifying the at least one different executable object or displaying the at least one different executable object may be determined based on execution heuristics including the operation history of the second sub region 320. In various embodiments of the disclosure, the display order of the at least one different executable object may be determined based on a recent execution history (or execution order). For example, the executable object H disposed in the topmost position among the at least one executable object within the list 403 may be an executable object for indicating an application executed most recently within the second sub region 320 among the at least one application indicated by the at least one executable object. In various embodiments of the disclosure, the display order of the at least one executable object may be determined based on the degree of association with the first screen A. For example, the executable object H disposed in the topmost position among the at least one executable object within the list 403 may be an executable object for indicating an application having the highest degree of association with the first screen A among the at least one application indicated by the at least one executable object.

In various embodiments of the disclosure, the display order of the at least one executable object may be determined based on the current time. For example, the electronic device according to an embodiment may identify an executable object H indicating an application executed most frequently at the current time, and may display the executable object H in the topmost position of the list 403. In various embodiments of the disclosure, the display order of the at least one executable object may be determined based on the place at which the electronic device is positioned.

For example, the electronic device according to an embodiment may identify an executable object H indicating a music playback application, which has been most frequently executed at home, based on identifying that the electronic device is positioned home by using at least one of the communication circuit of the electronic device or the GPS module of the electronic device, and may display the executable object H in the topmost position of the list 403.

As another example, the electronic device according to an embodiment may identify an executable object H indicating a navigation application, which has been executed most frequently in a car, based on identifying that the electronic device is positioned in a car by using at least one of the communication circuit of the electronic device or the GPS module of the electronic device, and may display the executable object H in the topmost position of the list 403. However, this is not limiting in any manner.

The electronic device according to various embodiments may display the first screen within the first sub region, in response to receiving an input for selecting a first executable object among the at least one executable object included in the list, and may display an execution screen for the application indicated by the first executable object, within the second sub region. For example, the input may include a single tap input. For example, the input may correspond to touching the first executable object with a depression strength weaker than a reference strength. As another example, the input may correspond to touching the first executable object for a period of time shorter than a reference time. However, this is not limiting in any manner.

For example, referring to FIG. 4A, in the state 400-2, the electronic device according to an embodiment may receive an input 404 for selecting a first executable object B within the list 403. The electronic device according to an embodiment may switch the state 400-2 to a state 400-3 in response to receiving the input 404. In the state 400-3, the electronic device according to an embodiment may display a first screen A within the first sub region 310 and may display an execution screen B for the application indicated by the first executable object B within the second sub region 320. For example, the electronic device according to an embodiment may display the execution screen B concurrently and together with the first screen A, thereby providing a split screen state.

The electronic device according to various embodiments may receive a second drag input directed from the edge region within the first region to another region within the first region, which is different from the edge region, while displaying the first screen within the first sub region and displaying the execution screen within the second sub region. For example, the electronic device according to an embodiment may receive a second drag input directed from the edge region within the second region to another region within the second region, which is different from the edge region, while displaying the first screen within the first sub region and displaying the execution screen within the second sub region.

The electronic device according to various embodiments may display a list as partially superimposed on the execution screen displayed within the second sub region, in response to receiving the second drag input. In various embodiments of the disclosure, the first executable object indicating the application providing the execution screen within the second sub region may be removed from the list displayed in response to receiving the second drag input. In various embodiments of the disclosure, when the application providing the execution screen within the second sub region is an application capable of providing multi-tasking, the first executable object may be maintained instead of being removed from the list displayed in response to receiving the second drag input.

For example, referring to FIG. 4B, the electronic device according to an embodiment may display a first screen A within the first sub region 310 and may display an execution screen B within the second sub region 320 in a state 400-3. The electronic device according to an embodiment may receive, in the state 400-3, a second drag input 405 directed from an edge region of the second sub region 302 toward another region within the second sub region 320. The electronic device according to an embodiment may switch the state 400-3 to a state 400-4 in response to receiving the second drag input 405.

The electronic device according to an embodiment may display a shaded region over the first screen A and the execution screen B in the state 400-4, in order to indicate that the state of the electronic device corresponds to a state in which another screen to be provided together with the first screen A and the execution screen B in the split screen state can be selected. Alternatively, the electronic device according to an embodiment may blur the first screen A and the execution screen B, unlike the state 400-4, in order to indicate that the state of the electronic device corresponds to a state in which another screen to be provided together with the first screen A and the execution screen B in the split screen state can be selected. The electronic device according to an embodiment may display a list 403-1 as partially superimposed over the second sub region 320 in the state 400-4. When the application providing the execution screen B does not support multi-tasking, the list 403-1 may not include the first executable object B, unlike the list 403.

The electronic device according to an embodiment may receive an input for selecting a second executable object among at least one executable object included in the list, while displaying the list as superimposed over the first screen displayed within the first sub region and the execution screen displayed within the second sub region. The electronic device according to an embodiment may maintain the display of the first screen within the first sub region, in response to receiving an input for selecting the second executable object, may reduce the execution screen displayed within the second sub region, and may display another execution screen for another application indicated by the second executable object, below the reduced execution screen.

For example, referring to FIG. 4B, the electronic device according to an embodiment may receive an input 406 for selecting the second executable object C included in the list 403-1, in the state 400-4. The electronic device according to an embodiment may switch the state 400-4 to a state 400-5 in response to receiving the input 406. In the state 400-5, the electronic device according to an embodiment may maintain the display of the first screen A within the first sub region 310, may reduce the execution screen B displayed within the second sub region 320, and may display another execution screen C for another application indicated by the second executable object C below the reduced execution screen B.

The electronic device according to an embodiment may receive a third drag input directed from the edge region within the first region to another region within the first region, which is different from the edge region, while displaying the first screen within the first sub region and displaying the execution screen and the other execution screen within the second sub region. In response to receiving the third drag input, the electronic device according to an embodiment may display a list as partially superimposed on the execution screen and the other execution screen displayed within the second sub region, the first executable object for indicating an application providing the execution screen and the second executable object for indicating another application providing the other execution screen being excluded from the list.

In various embodiments of the disclosure, when at least one of the application providing the execution screen or the other application providing the other execution screen is an application capable of providing multi-tasking, at least one of the first executable object or the second executable object may be maintained without being removed from the list displayed in response to receiving the third drag input.

For example, referring to FIG. 4B, the electronic device according to an embodiment may display a first screen A within the first sub region 310 and may display an execution screen B and another execution screen C within the second sub region 320, in the state 400-5. The electronic device according to an embodiment may receive a third drag input 407 directed from an edge region of the second sub region 320 toward another region within the second sub region 320, in the state 400-5. The electronic device according to an embodiment may switch the state 400-5 to a state 400-6 in response to receiving the third drag input 407.

The electronic device according to an embodiment may display a shaded region over the first screen A, the execution screen B, and the other execution screen C in the state 400-6, in order to indicate that the state of the electronic device corresponds to a state in which another screen to be provided together with the first screen A and the execution screen B in the split screen state can be selected. Alternatively, electronic device according to an embodiment may blur the first screen A, the execution screen B, and the other execution screen C, unlike the state 400-6, in order to indicate that the state of the electronic device corresponds to a state in which another screen to be provided together with the first screen A and the execution screen B in the split screen state can be selected. The electronic device according to an embodiment may display a list 403-2 as partially superimposed over the second sub region 320 in the state 400-6. When at least one of the application providing the execution screen B or the application providing the other execution screen C is an application that does not support multi-tasking, the list 403-2 may not include the first executable object B and the second executable object C, unlike the list 403 and the list 403-1.

The electronic device according to an embodiment may receive an input for selecting a third executable object among at least one executable object included in the list, while displaying the list as superimposed over the execution screen and the other execution screen displayed within the second sub region. In response to receiving the input for selecting the third executable object, the electronic device according to an embodiment may maintain the display of the first screen within the first sub region and the display of the execution screen within a part of the second sub region, and may switch the other execution screen displayed within the remaining part of the second sub region to an execution screen for an application indicated by the third executable object.

For example, referring to FIG. 4B, the electronic device according to an embodiment may receive an input 408 for selecting a third executable object D included in the list 403-2, in the state 400-6. The electronic device according to an embodiment may switch the state 400-6 to a state 400-7 in response to receiving the input 408. In the state 400-7, the electronic device according to an embodiment may maintain the display of the first screen A within the first sub region 310 and display of the execution screen B within a part of the second sub region 320, and may switch the other execution screen C displayed in the remaining part of the second sub region 320 to an execution screen D for an application indicated by the third executable object D. In various embodiments of the disclosure, when switching the execution screen C to an execution screen D for an application indicated by the third executable object D, the executable object C may be disposed in the topmost position among the at least one executable object within the list 403-2.

While displaying the first screen within the first region and displaying the list as superimposed over the first screen displayed within the first region, the electronic device according to an embodiment may receive an input for selecting a designated object included in the list. In various embodiments of the disclosure, the designated object may be an object for expanding the display region of the list. In various embodiments of the disclosure, the designated object may be an object for displaying the at least one other executable object newly displayed based on a scroll input regarding the list, together with the at least one executable object, due to the limited area of the list superimposed over the first screen displayed within the first region.

In response to receiving the input for selecting the designated object, the electronic device according to an embodiment may switch the first screen displayed within the first sub region and the execution screen displayed within the second sub region to an expanded list. In response to receiving the input for selecting the designated object, the electronic device according to an embodiment may display the expanded list as partially superimposed over the first screen displayed within the first sub region and the execution screen displayed within the second sub region. However, this is not limiting in any manner.

In various embodiments of the disclosure, at least one executable object displayed in an upper position among the executable objects included in the list or the expanded list (for example, six executable objects) may be displayed in the recently executed order, and the remaining objects among the executable objects may be displayed in the alphabetical order. In various embodiments of the disclosure, the number of at least one executable object displayed in the upper position may be determined based on user designation or electronic device setting. In various embodiments of the disclosure, the at least one executable object displayed in the upper position may be changed if the recently executed application is changed by the user's use of the electronic device. For example, if an application indicated by an executable object among the remaining executable objects is executed by the user's use of the electronic device, the electronic device according to an embodiment may update the list or the expanded list such that the at least one executable object displayed in the upper position includes the executable object for indicating the application. In various embodiments of the disclosure, the executable object for indicating the application, which has been included in the remaining executable objects, may be removed from the remaining executable objects by the user's use of the electronic device.

For example, referring to FIG. 4C, while providing the split screen by using the display (for example, the display 140 in FIG. 2A and/or the first display 140-1 in FIG. 2B), the processor (for example, the processor 120 in FIG. 1A to FIG. 1B) of the electronic device 101 may display a first application execution screen within the first sub region 310 and may display a second application execution screen and a third application execution screen within the second sub region 320, in a state 410. In various embodiments of the disclosure, the state 410 may refer to a state in which the electronic device 101 displays the split screen by using the display. In various embodiments of the disclosure, the first application may be an application that has been executed in the foreground before the electronic device 101 provided the split screen. For example, the first application execution screen may be a screen that has been displayed in the entire first region (or entire display region of the display) during a state before the electronic device 101 provided the split screen.

In various embodiments of the disclosure, switching to the split screen may be performed by a designated input. The designated input may include a user input and/or a gesture requesting entry into the split screen. For example, the designated input may include a gesture (for example, long-touch gesture of touching the object for a designed period of time or longer) for selecting a designated object (for example, executable object in the second region for checking the currently executed application) displayed within the display of the electronic device 101. Switching to the split screen will be described with reference to FIG. 4D to FIG. 4E and FIG. 5.

In various embodiments of the disclosure, the second application may be one of multiple applications executed in the background while the first application execution screen is displayed in the entire first region (or entire display region of the display), or while the first application is solely executed in the foreground. In various embodiments of the disclosure, the second application may be an application that has been executed in the foreground directly before the first application was solely executed in the foreground.

In various embodiments of the disclosure, the third application may be an application that has been in the foreground directly before the second application was in the foreground, or an application that has been in the foreground together with the second application.

The electronic device according to various embodiments may further display an object 415 for maintaining, controlling, and/or moving at least one of the second application execution screen or the third application execution screen, within the second sub region 320. In various embodiments of the disclosure, the object 415 may be displayed as superimposed on or as floated on at least one of the second application user interface or the third application user interface. In various embodiments of the disclosure, the object 415 may be moved based on a drag input regarding the object 415. The electronic device 101 according to various embodiments may move and/or fix the user interface disposed below the object 415, based on a touch input and/or a drag input regarding the object 415.

The electronic device 101 according to an embodiment may receive a touch input regarding an object 415 superimposed on the second application execution screen, while displaying the second application execution screen and the third application execution screen within the second sub region 320. In response to receiving the touch input regarding the object 415, the electronic device 101 may make the second application execution screen configured with a fixed state or a pin state.

Referring to FIG. 4D, while providing the split screen by using the display, the electronic device 101 according to an embodiment may display a first application user interface within the first sub region 310 and may display at least a part of a list including multiple items for indicating multiple applications other than the first application, respectively, within the second sub region 320, in a state 420. In various embodiments of the disclosure, the list may include a first sub list 422 and a second sub list 424, or may be configured with a first sub list 422 and a second sub list 424.

In various embodiments of the disclosure, the first sub list 422 may include at least one item for indicating at least one recently executed application, respectively. In various embodiments of the disclosure, the first sub list 422 may include at least one item for indicating at least one frequently executed application, respectively. In various embodiments of the disclosure, the first sub list 422 may include at least one item for indicating at least one application recommended based on the user's application use pattern, respectively. In various embodiments of the disclosure, the first sub list 422 may include at least one item for indicating at least one application that can interwork with the first application, respectively. However, this is not limiting in any manner.

In various embodiments of the disclosure, the second sub list 424 may include multiple items for indicating multiple applications installed in the electronic device 101, respectively. However, this is not limiting in any manner The arrangement (for example, display order) of the at least one item included in the first sub list 422 or the multiple items included in the second sub list 424 may be changed according to the user setting or the configuration of the electronic device 101. At least one of the at least one item included in the first sub list 422 or the multiple items included in the second sub list 424 may be scrolled in response to a drag input regarding the second sub region 320.

The electronic device 101 according to various embodiments may receive an input 426 for selecting an item among the items included in the first sub list 422 or the second sub list 424, in the state 420. In response to receiving the input 426, the electronic device 101 may display an execution screen for the application indicated by the selected within the second sub region 320, as in the state 430. In response to receiving the input 426, the electronic device 101 according to an embodiment may move the list within the second sub list 320, as in the state 430, such that at least a part of the list is displayed below the user interface of the application indicated by the selected item.

The electronic device 101 according to various embodiments may receive an input 435 for selecting an item from the multiple items included in the list displayed below the region displaying the user interface of the application indicated by the selected item, in the state 430. In response to receiving the input 435, the electronic device 101 may display a user interface of another application indicated by the item selected by the input 435, as in the state 440, below the user interface of the application that has been newly displayed in the state 430. The electronic device 101 according to various embodiments may cease to display the list within the second sub region 320, when execution screens for at least two applications are displayed within the second sub region 320 as in the state 440. However, this is not limiting in any manner Referring to FIG. 4E, while providing the split screen by using the display, the electronic device 101 according to an embodiment may display the first page among multiple pages included in the home screen or wall paper within the first sub region 310, and may display the second page among the multiple pages and at least one icon (for example, Top 5 icons) within the second sub region 320, in a state 450. In various embodiments of the disclosure, the first page may correspond to a page that has been displayed on the home screen before the electronic device 101 provided the split screen, among the multiple pages configured in the home screen. In various embodiments of the disclosure, the first page may include at least one of at least one icon for indicating at least one widget or at least one application, respectively. In various embodiments of the disclosure, the first region 310 displaying the first page may further include multiple page indicators 452 for indicating the multiple pages, respectively. The page indicator for indicating the first page, among the multiple page indicators 452, may be highlighted relative to the remaining page indicators.

In various embodiments of the disclosure, the second page displayed within the second sub region 320 may be the page preceding the first page, or the page following the first page. In various embodiments of the disclosure, the second page may include at least one of at least one icon for indicating at least one widget or at least one application, respectively. In various embodiments of the disclosure, the at least one icon 454 (for example, Top 5 icons) displayed below the second page within the second sub region 320 may include an icon disposed below any one page among the multiple pages before the electronic device 101 provided the split screen. In various embodiments of the disclosure, the at least one icon 454 displayed below the second page within the second sub region 320 may be an icon maintained independently of an input for switching from the first page to any one page among the multiple pages before the electronic device 101 provided the split screen. Alternatively, at least some of multiple icons for indicating multiple applications installed within the electronic device 101, respectively, may be displayed within a part of the second sub region 320 instead of the at least one icon 454.

In various embodiments of the disclosure, multiple page indicators 452 may be displayed below the second page within the second sub region 320. The page indicator for indicating the second page, among the multiple page indicators 452, may be highlighted relative to the remaining page indicators.

In response to a drag input regarding the first page displayed within the first sub region 310, the electronic device 101 according to various embodiments may display the second page switched from the first page within the first sub region 310, in the state 450. In response to displaying the second page switched from the first page within the first sub region 310, the processor 120 may display the first page switched from the second page in a part of the second sub region 320.

In response to a drag input regarding the second page displayed within a part of the second sub region 320, the electronic device 101 according to various embodiments may display the first page switched from the second page within a part of the second sub region 320, in the state 360. In response to displaying the first page switched from the second page within the second sub region 320, the electronic device 101 may display the second page switched from the first page in the first sub region 310.

Based on receiving a designated input while providing a single screen within the first region (or the entire display region of the display), the electronic device 101 according to various embodiments may switch the single screen to the split screen. In other words, the electronic device 101 may display the split screen switched from the single screen, in response to receiving the designated input. Hereinafter, an operation of the electronic device 101 performing switching between the single screen and the split screen, based on the designated input, will be described with reference to FIG. 5.

Figure 5:
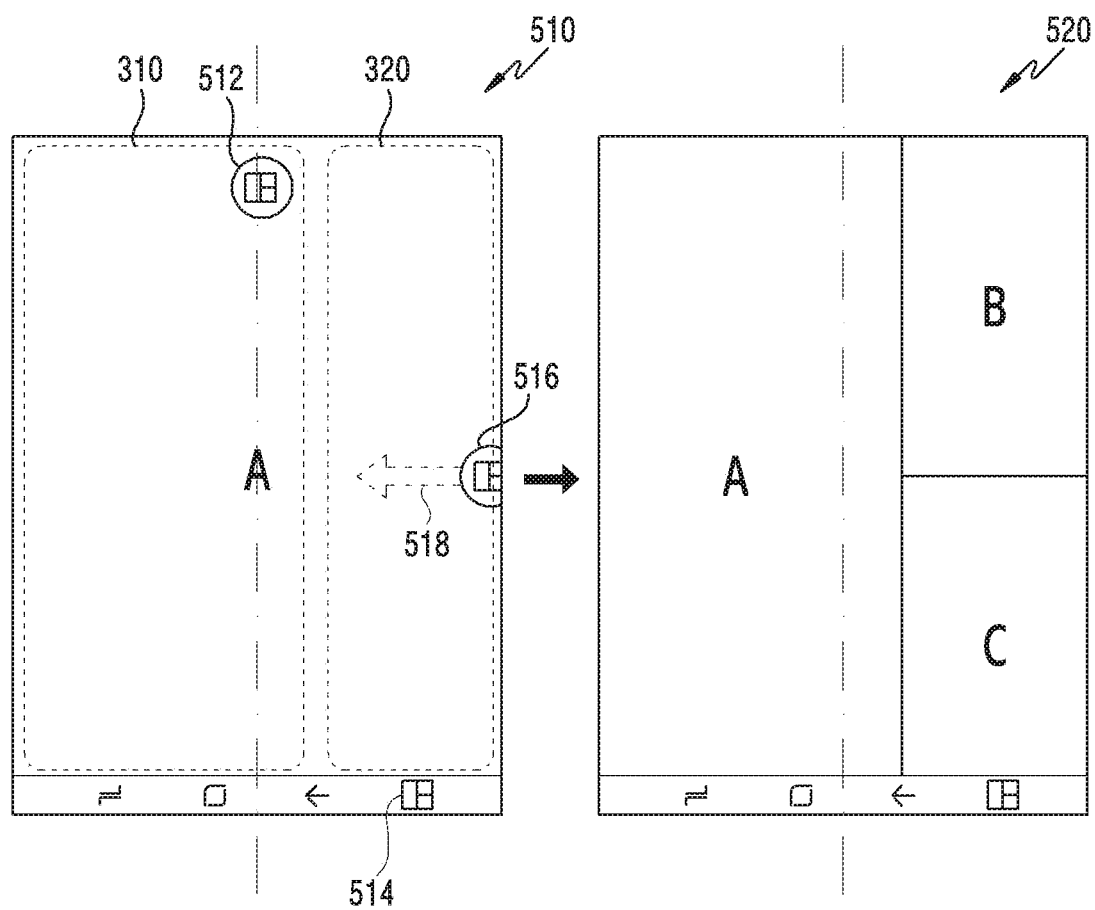
FIG. 5 illustrates a switching a single screen display state to a split screen display state in an electronic device according to an embodiment of the disclosure.

FIG. 5 illustrates a switching from a single screen display state to a split screen display state in an electronic device according to an embodiment of the disclosure. The electronic device in FIG. 5 may correspond to the electronic device 101 in FIG. 1A to FIG. 1B and/or FIG. 2A to FIG. 2B.

Referring to FIG. 5, the electronic device according to an embodiment may display a first screen within the first region including a first sub region 310 and a second sub region 320, in a state 510. According to embodiments of the disclosure, the first region may correspond to the remaining part of the display region of the display, excluding the second region and/or the third region, or may correspond to the entire display region. In response to receiving a designated input for entering the split screen from the single screen in the state 510, the electronic device according to an embodiment may switch and/or enter from the state 510 to a state 520.

In an embodiment of the disclosure, the state 520 may refer to a state in which the split screen is provided (for example, the states 410, 420, 430, 440, and 450 in FIG. 3 and FIG. 4C to FIG. 4E). In an embodiment of the disclosure, the state 520 may refer to a state wherein the first screen is displayed within the first sub region 310, and a second screen and a third screen, each of which is distinguished from the first screen, are displayed within the second sub region 320. If a split screen was displayed before the state 510, switching from the state 510 to the state 520 may refer to restoring the split screen displayed before the state 510.

The designated input may be implemented in various methods. The electronic device according to an embodiment may further display at least one of objects 512 and 516 which are superimposed on the first screen, and which are usable for switching to the split screen, in the state 510. In response to receiving a touch input regarding at least one displayed among the objects 512 and 516, the electronic device may switch from the state 510 to the state 520. The touch input may include, for example, a drag input of dragging the object 516 in the designated direction 518. The electronic device according to an embodiment may receive a drag input directed from the edge part of the first region toward another part of the first region, in the state 510. In response to receiving the drag input, the electronic device may switch from the state 510 to the state 520. The electronic device according to an embodiment may further display an object 514 within the second region (for example, control region) below the first region, in the state 510. The object 514 may be usable for switching to the split screen. In response to receiving a touch input regarding the object 514, the electronic device may switch from the state 510 to the state 520.

When the display is configured with a foldable display and/or a flexible display (for example, the first display 140-1 in FIG. 2B), the electronic device according to an embodiment may switch the state of the electronic device based on a change in the posture and/or type of the electronic device 101. In various embodiments of the disclosure, a change in the posture of the electronic device may include a change in the angle between multiple housings included in the electronic device (for example, the first housing 210 and the second housing 220 in FIG. 2B). Hereinafter, an operation of the electronic device according to an embodiment switching the state based on a change in the angle will be described with reference to FIG. 6. The state switching operation may include an operation of switching from the state 520 to another state distinguished from the state 520.

Figure 6:
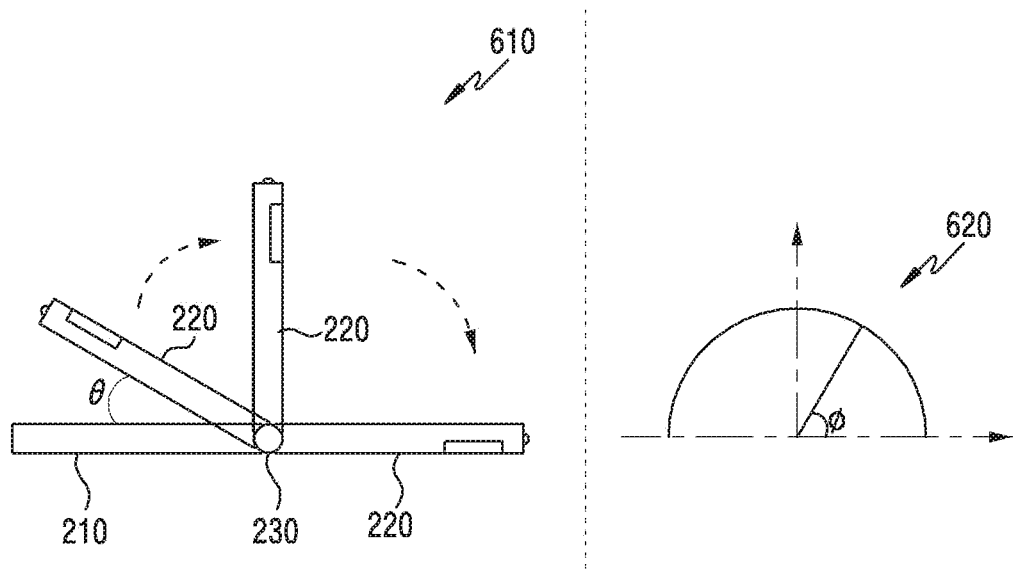
FIG. 6 illustrates a change in a posture of an electronic device according to an embodiment of the disclosure.

FIG. 6 illustrates a change in a posture of an electronic device according to an embodiment of the disclosure. The electronic device in FIG. 6 may correspond to the electronic device 101 in FIG. 1A to FIG. 1B and/or the electronic device 101 in FIG. 2B. For example, the electronic device in FIG. 6 may include multiple housings in FIG. 2B (first housing 210 and second housing 220). The electronic device in FIG. 6 may include multiple displays in FIG. 2B (first display 140-1 and second display 140-2). Hereinafter, an operation of the electronic device switching the state, based on an embodiment (for example, electronic device including an in-folding flexible display) in which at least one display included in the electronic device is substantially covered by rotation of multiple housings (first housing 210 and second housing 220)), will be described.

Referring to FIG. 6, the first housing 210 and the second housing 220 are rotatably connected through the folding part 230, as in the state 610, such that the electronic device may have various postures and/or various types according to the angle between the first housing 210 and the second housing 220. The angle between the first housing 210 and the second housing 220 may be defined as in the graph 620.

The electronic device according to an embodiment may control at least one display included in the electronic device, based on the angle θ between the first housing 210 and the second housing 220. For example, if the angle between the first housing 210 and the second housing 220 is outside a designated range (for example, range between φ and 180° (π) in the graph 620), the electronic device according to an embodiment may activate the first display (for example, the first display 140-1 in FIG. 2B) disposed from the front surface (for example, the front surface) of the first housing 210 to the front surface (for example, the third surface) of the second housing 220.

For example, when the angle between the first housing 210 and the second housing 220 is within the designated range (for example, range between 0° (0) and φ in the graph 620), the electronic device according to an embodiment may deactivate the first display, and may activate a second display (for example, the second display 140-2 in FIG. 2B) distinguished from the first display. The electronic device according to an embodiment may identify a change in the state of the electronic device from the state 510, that is, a change in the angle between the first housing 210 and the second housing 220, by using a sensor circuit (for example, the sensor circuit 180 in FIG. 1A to FIG. 1B). Based on at least one of the angle or the designated range, the electronic device according to an embodiment may selectively activate and/or control at least one of the first display or the second display. An operation of the electronic device according to various embodiments selectively controlling at least one of the first display or the second display so as to provide a split screen will be described with reference to FIG. 7, FIG. 8A to FIG. 8B, and FIG. 9.

In an embodiment of the disclosure, the flexible display included in the electronic device (for example, electronic device including an out-folding flexible display) may be bent, without being covered, by rotation of multiple housings (first housing 210 and second housing 220). In this case, the electronic device may control the flexible display in a manner distinguished from an embodiment in which the above-mentioned in-folding flexible display is included. For example, the electronic device may activate the entire display region of the flexible display while the angle between the first housing 210 and the second housing 220 is outside a designated range (for example, range between φ and 180° (π) in the graph 620).

While the angle between the first housing 210 and the second housing 220 is within a designated range (for example, range between 0° (0) to φ in the graph 620), the electronic device may activate a part of the display region of the flexible display and may deactivate another part of the display region, which is distinguished from the part. The activated part of the display region may correspond to a part of the display region relatively far from the surface of the earth and/or a part of the display region that the user of the electronic device is gazing at, for example. An operation of the electronic device, which includes an out-folding flexible display, controlling the flexible display so as to provide a split screen will be described with reference to FIG. 7, FIG. 8A to FIG. 8B, and FIG. 10.

Figure 7:
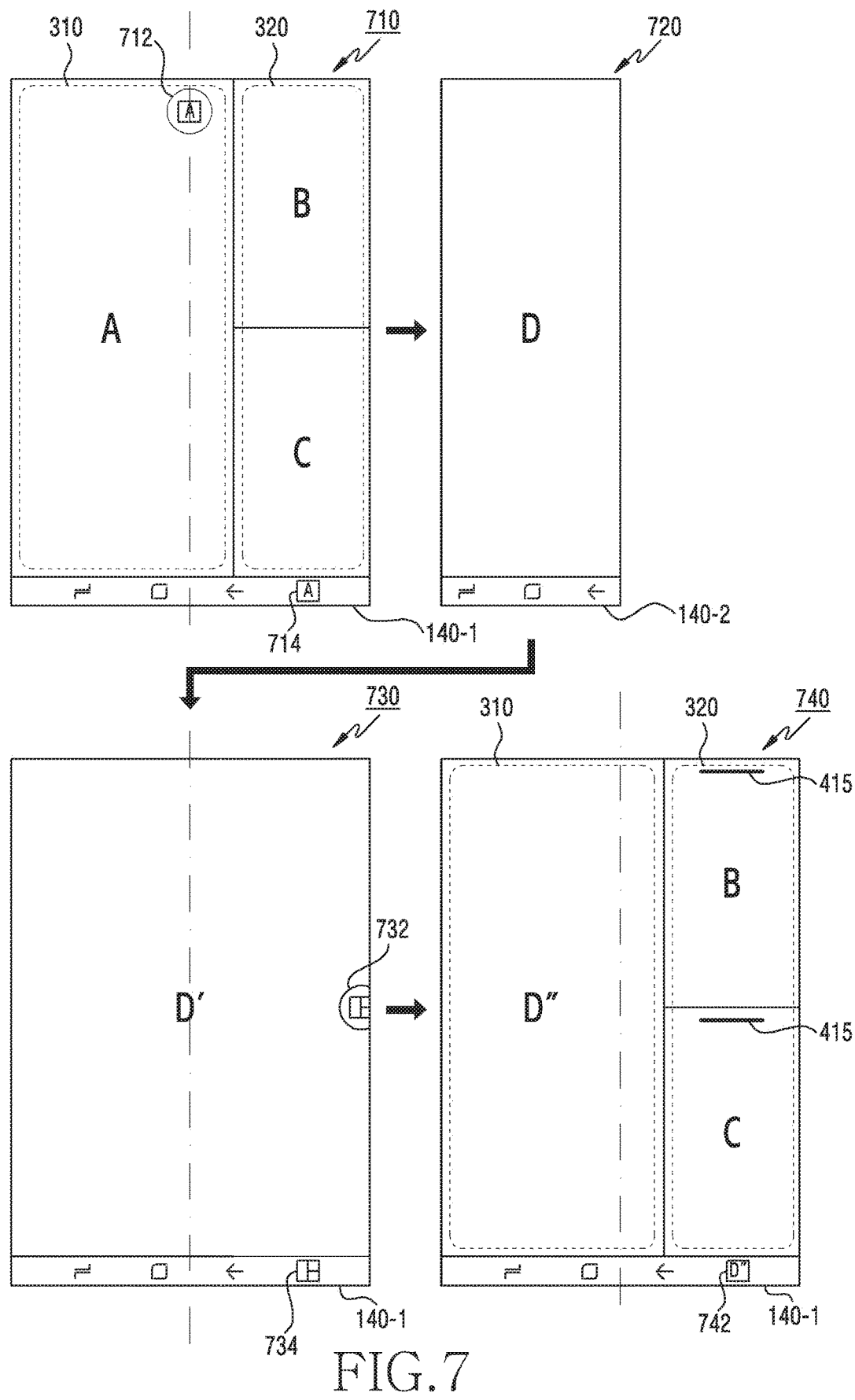
FIG. 7 illustrates an operation of an electronic device switching states according to a posture of the electronic device and/or a user input according to an embodiment of the disclosure.

FIG. 7 illustrates an operation of an electronic device switching a state according to a posture of the electronic device and/or user input according to an embodiment of the disclosure. The electronic device in FIG. 7 may correspond to the electronic device 101 in FIG. 1B and/or FIG. 2B. For example, the first display 140-1 and the second display 140-2 in FIG. 7 may correspond to the first display 140-1 and the second display 140-2 in FIG. 1B and/or FIG. 2B, respectively.

Referring to FIG. 7, the electronic device according to an embodiment may display a first screen (a first sub region 310 marked A in FIG. 7) within the first sub region 310 and may display a second screen (a part of the second sub region 320 in FIG. 7, which is marked B) and a third screen (a part of the second sub region 320 in FIG. 7, which is marked C) within the second sub region 320, in a state 710. The state 710 may correspond to a state in which a split screen is displayed. For example, the state 710 may correspond to the states 410, 420, 430, 440, and 450 in FIG. 3 and FIG. 4C to FIG. 4E and the state 520 in FIG. 5.

The electronic device according to an embodiment may further display at least one of objects 712 and 714 for switching to a single screen in the state 710. For example, the electronic device may display an object 712 superimposed or floated in the first region, or may display an object 714 superimposed or floated in the second region. In various embodiments of the disclosure, the object 712 may be moved by a drag input. In various embodiments of the disclosure, the object 712 may further include a thumbnail image for showing the first screen to be displayed within the first region configured with the first sub region 310 and the second sub region 320. The operation performed by the electronic device in response to selection of the objects 712 and 714 will be described with reference to FIG. 9.

In response to receiving an input of selecting at least one of the objects 712 and 714 in the state 710, the electronic device according to an embodiment may switch or enter from the state 710 in which a split screen is displayed to another state in which a single screen is displayed (for example, the state 510 in FIG. 5). In various embodiments of the disclosure, the other state may refer to a state in which the first screen is displayed in the entire first region configured with a first sub region 310 and a second sub region 320.

For example, the user of the electronic device may perform a designated input of changing the posture and/or type of the electronic device in the state 710 in which a split screen is displayed within the first display 140-1. The designated input may include an operation of the user rotating multiple housings of the electronic device around the folding part of the electronic device so as to contact portions of the first display 140-1. By the designated input, the angle between the multiple housings may be reduced into the designated range in FIG. 6 (for example, range between 0° (0) to φ in the graph 620).

In response to receiving the designated input, the electronic device according to an embodiment may switch from the state 710 to a state 720. The electronic device according to an embodiment may erase frame data stored in the GRAM operatively connected to both the first display 140-1 and the second display 140-2, in order to prevent distortion of frame data occurring when frame data based on the first display 140-1 is instantly displayed on the second display 140-2 when switching from the state 710 to the state 720.

The electronic device according to an embodiment may deactivate the first display 140-1 in the state 720. Deactivation of the first display 140-1 may include a state in which power less than reference power is input to the first display 140-1, a state in which the DDIC of the first display 140-1 does not scan frame data (for example, frame data stored in the GRAM), and/or a state in which frame data corresponding to the first display 140-1 is removed from the GRAM, or the frame data is no longer stored in the GRAM. In the state 720, the electronic device according to an embodiment may cease to display the first screen to the third screen within the first display 140-1 as in the state 710. After ceasing to display the first screen to the third screen, the state of at least one application corresponding to each of the first screen to the third screen may switch to a background state.

In the state 720, the electronic device according to an embodiment may activate a second display 140-2 distinguished from the first display 140-1, in response to a designated input of waking up the electronic device. The input of waking up the electronic device may include an operation of pressing a designated button of the electronic device, an operation of tapping the second display 140-2, and an operation of rotating the electronic device by a designated angle or more, and/or an operation of inputting a designated voice command Referring to FIG. 7, the electronic device according to an embodiment may display a fourth screen within the second display 140-2 in response to receiving a designated input of waking up the electronic device, in the state 720. In an embodiment of the disclosure, the fourth screen may correspond to one (for example, first screen A) of multiple execution screens that have been displayed within the first display 140-1 in the state 710.

In an embodiment of the disclosure, the fourth screen may be distinguished from the first to third screens that have been displayed within the first display 140-1 in the state 710. For example, the fourth screen may correspond to a home screen and/or a lock screen provided by the operating system of the electronic device. The home screen may include multiple icons corresponding to multiple applications installed in the electronic device, respectively, or may include at least one widget provided based on at least one of the multiple applications. The lock screen may include an execution screen (for example, UI including a message requiring the user's biometric information, or including a soft keyboard for entering a password and/or a PIN number) for determining whether or not the user who controls the electronic device is a pre-registered user, before entering the home screen.

In the state 720 wherein the first display 140-1 is covered by multiple folded housings, the user of the electronic device may control the electronic device by using the second display 140-2. The fourth screen may be based on an application displayed according to control of the electronic device by the user of the electronic device. In the state 720, the user of the electronic device may perform a designated input of changing the posture and/or type of the electronic device. The designated input may include the user's operation of rotating multiple housings of the electronic device around the folding part of the electronic device to separate the contacted portions of the first display 140-1. By the designated input, the angle between the multiple housings may increase out of the designated range in FIG. 6 (for example, range between 0° (0) to φ in the graph 620).

In response to receiving the designated input, the electronic device according to an embodiment may switch from the state 720 to a state 730. The electronic device according to an embodiment may erase frame data stored in the GRAM operatively connected to both the first display 140-1 and the second display 140-2, in order to prevent distortion of frame data occurring when frame data based on the second display 140-2 is instantly displayed on the first display 140-1 when switching from the state 720 to the state 730.

The electronic device according to an embodiment may deactivate the second display 140-2 in the state 730. Deactivation of the second display 140-2 may include a state in which power less than reference power is input to the second display 140-2, a state in which the DDIC of the second display 140-2 does not scan frame data (for example, frame data stored in the GRAM), and/or a state in which frame data corresponding to the second display 140-2 is removed from the GRAM, or the frame data is no longer stored in the GRAM. In the state 730, the electronic device according to an embodiment may cease to display the fourth screen within the second display 140-2 as in the state 720.

In the state 730, the electronic device according to an embodiment may activate the first display 140-1. Activation of the first display 140-1 may include a state in which reference power is input to the first display 140-1, a state in which the DDIC of the first display 140-1 scans frame data (for example, frame data stored in the GRAM), and/or a state in which frame data corresponding to the first display 140-1 is stored in the GRAM. Activation of the second display 140-2 is similar to activation of the first display 140-1, and detailed description thereof will be omitted herein.

In the state 730, the second screen and/or the third screen, which have been displayed within the second sub region 320 in the state 710, may disappear. In order to maintain continuity between the state 720 and the state 730, the electronic device according to an embodiment may display a fifth screen at least based on the fourth screen that has been displayed within the second display 140-2 in the state 720, within the first display 140-1. The fifth screen may be based on an application executed to display the fourth screen. The fifth screen may be produced based on the application corresponding to the fourth screen and based on the size and/or resolution of the first display 140-1. In order to display the fifth screen, the electronic device according to an embodiment may remove the frame data corresponding to the fourth screen, which has been displayed within the second display 140-2, from the GRAM of the electronic device.

In the state 730 in which the fifth screen related to the fourth screen in the state 720 is displayed, the electronic device according to an embodiment may further display an object 732 for returning to the state 710 within the first region of the first display 140-1. Alternatively, the electronic device may further display an object 734 for returning to the state 710 within the second region. The objects 732 and 734 may be configured to display at least one screen (for example, second screen and/or third screen that have been displayed in the second sub region 320) that has been displayed on at least a part (for example, second sub region 320) of the first display 140-1 in the state 710, within the first display 140-1.

In response to receiving an input of receiving at least one of the objects 732 and 734 in the state 730, the electronic device according to an embodiment may switch from the state 730 to a state 740. The state 740 may correspond to a state in which at least one screen that has been displayed on at least a part of the first display 140-1 in the state 710 is restored. The input of selecting at least one of the objects 732 and 734 may include a gesture of dragging the object 732 in a designated direction (for example, horizontal direction of the first display 140-1) beyond a designated distance, for example.

Referring to FIG. 7, in the state 740, the electronic device according to an embodiment may split the first display 140-1 into a first sub region 310 and a second sub region 320. The electronic device may display an application that has been executed in the state 730 and/or a screen based on the fifth screen that has been displayed in the state 730, within the first sub region 310. The electronic device may display at least one of the second screen or the third screen, which has been displayed within the second sub region 320 in the state 710, within the second sub region 320.

In the state 740, the electronic device according to an embodiment may further display an object 742 for switching form the split screen to a sling screen, as in the state 710. The electronic device according to an embodiment may further display an object 415 for controlling the second screen or the third screen, which is displayed within the second sub region 320. As described above, in response to restoration of the posture and/or type of the electronic device (for example, restoration of the type of the electronic device between the state 710 to the state 730), the electronic device according to an embodiment may display at least one of objects 732 and 734 for restoring at least one screen that has been displayed on the first display 140-1 (for example, second screen or third screen that has been displayed within the second sub region 320 in the state 710).

When entering the state 740 from the state 730 according to an input of selecting at least one of the objects 732 and 734, the electronic device according to an embodiment may restore the screen displayed on the first display 140-1 based on at least one application currently executed. For example, when an application corresponding to at least one screen (for example, the second screen or the third screen) that has been displayed within the second sub region 320 in the state 710 is again executed in the state 720 and/or the state 730, the electronic device according to an embodiment may not display the screen corresponding to the application within the second sub region 320, in spite of entering the state 740. In this case, the screen corresponding to the application may be displayed continuously within the first sub region 310. Hereinafter, an operation of the electronic device according to an embodiment restoring the screen displayed on the first display 140-1 will be described with reference to FIG. 8A to FIG. 8B.

Figure 8A:
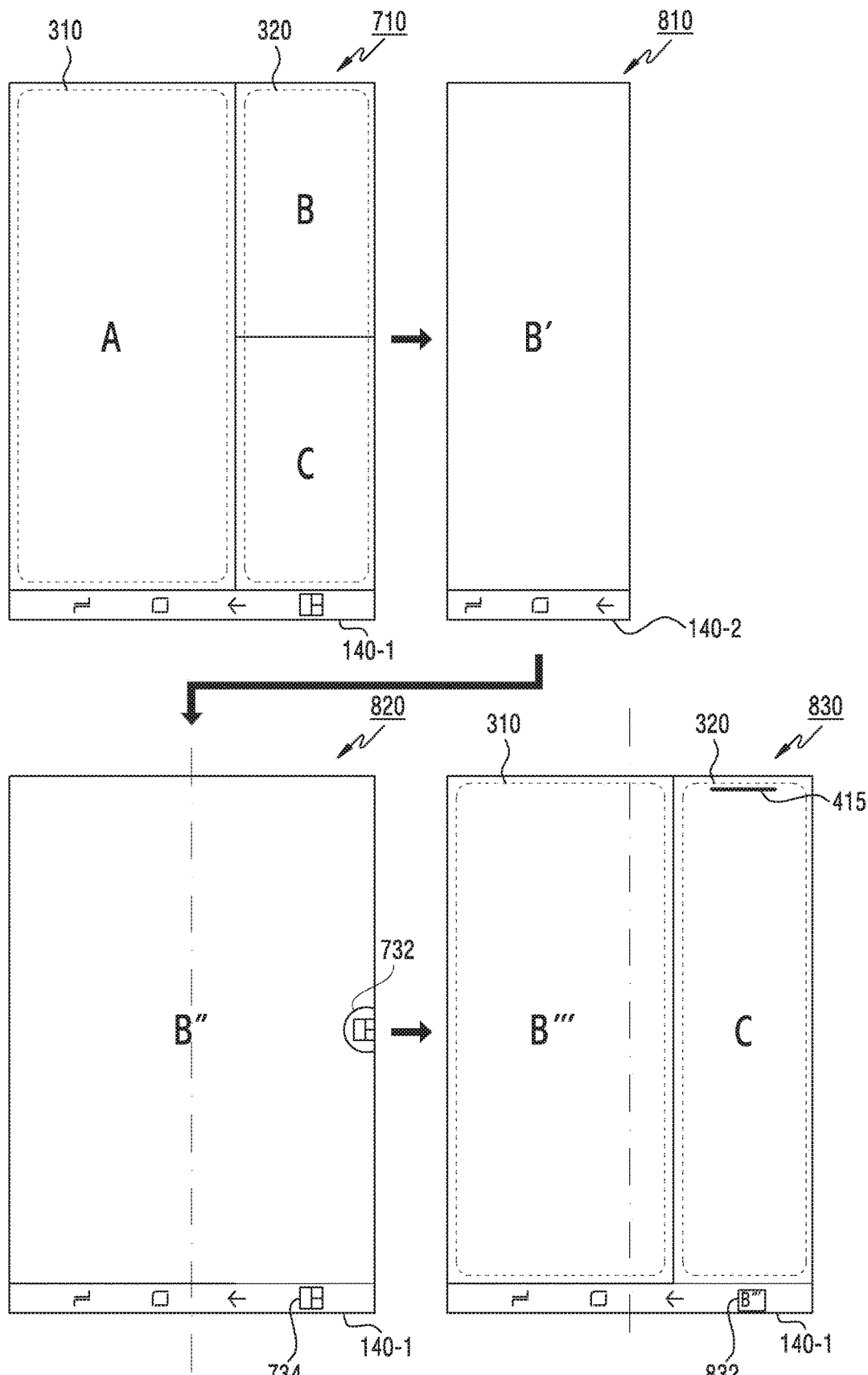
FIG. 8A illustrates an operation of an electronic device switching states according to a posture of the electronic device and/or a user input according to an embodiment of the disclosure.
Figure 8B:
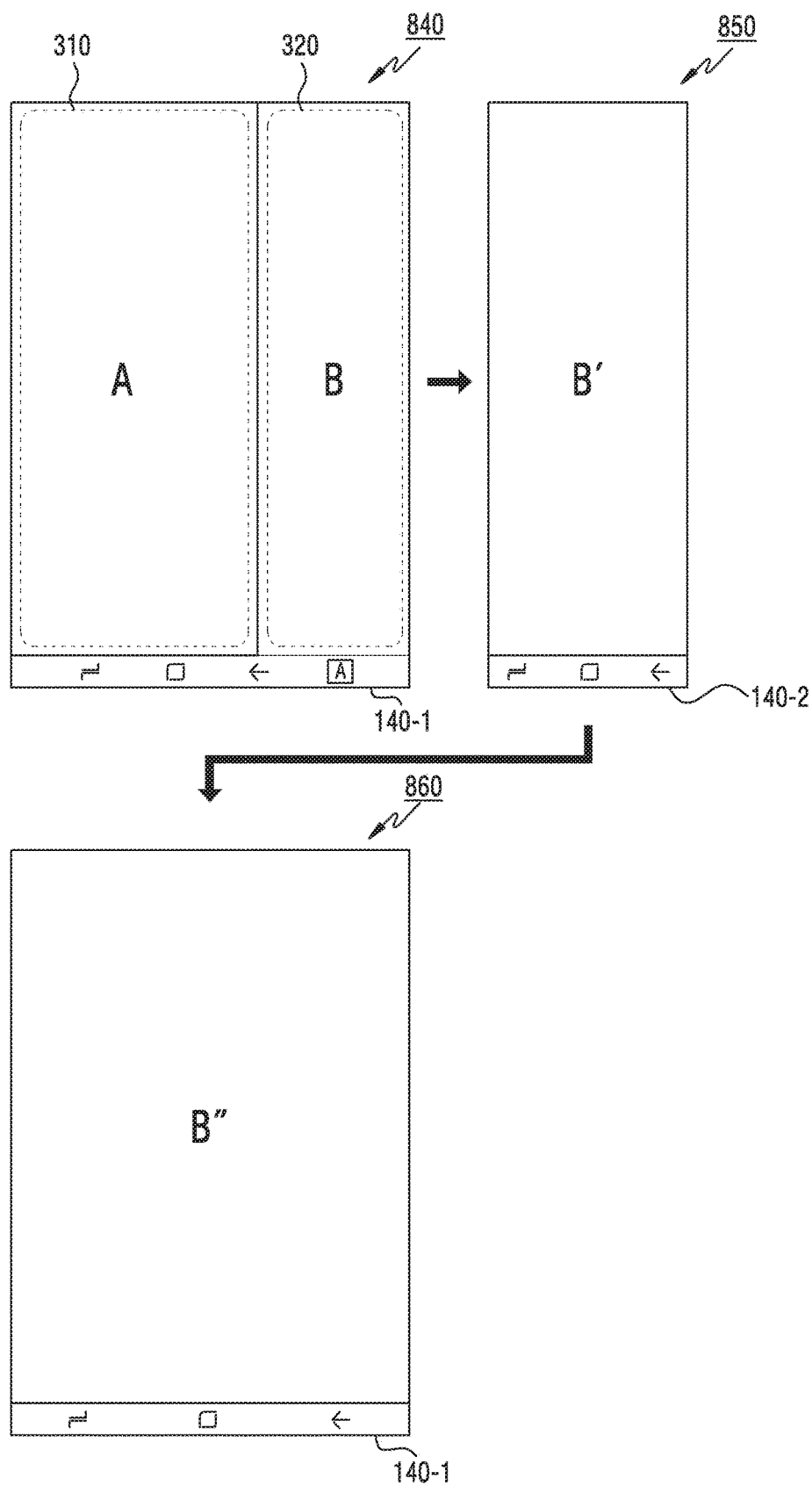
FIG. 8B illustrates an operation of an electronic device switching states according to a posture of the electronic device and/or a user input according to an embodiment of the disclosure.

FIG. 8A illustrates an operation of an electronic device switching a state according to a posture of the electronic device and/or a user input according to an embodiment of the disclosure, and FIG. 8B illustrates an operation of an electronic device switching a state according to a posture of the electronic device and/or a user input according to an embodiment of the disclosure. The electronic device in FIG. 8A to FIG. 8B may correspond to the electronic device 101 in FIG. 1B and/or FIG. 2B. For example, the first display 140-1 and the second display 140-2 in FIG. 8A to FIG. 8B may correspond to the first display 140-1 and the second display 140-2 in FIG. 1B and/or FIG. 2B, respectively. The state of the electronic device illustrated in FIG. 8A to FIG. 8B may correspond to the state of the electronic device illustrated in FIG. 7.

Referring to FIG. 8A, in a state 710, the electronic device according to an embodiment may display a split screen within the first display 140-1 similarly to the state 710 in FIG. 7. The split screen may include a first sub region 310 and a second sub region 320. The electronic device may display a first screen based on a first application within the first sub region 310, may display a second screen based on a second application within the second sub region 320, and may display a third screen based on a third application below the second screen in the second sub region 320. The first to third applications may differ from each other. The first to third applications may be executed independently of each other. In an embodiment of the disclosure, at least two of the first to third screens may be displayed based on at least two processes (or threads) executed independently by at least one application supporting a multi-instance mode.

In response to a change in the posture and/or type of the electronic device made by the user in the state 710, the electronic device may enter a state 810 from the state 710. The change in the posture and/or type of the electronic device may correspond to a change occurring when the user rotates multiple housings of the electronic device, thereby covering the first display 140-1.

In the state 830, the electronic device according to an embodiment may further display an object 832 for switching form the split screen to a sling screen, as in the state 710. After switching to the state 810, the user of the electronic device may activate the second display 140-2 and may control the electronic device. Referring to FIG. 8A, the user may execute a second application corresponding to the second screen that has been displayed in the second sub region 320 in the state 710, within the second display 140-2. Based on the second application, the electronic device may produce a fourth screen which is related to the second screen that has been displayed within the second sub region 320 in the state 710, and which is based on the size and/or resolution of the second display 140-2. The electronic device may display the produced fourth screen within the second display 140-2.

In response to a change in the posture and/or type of the electronic device made by the user in the state 810, the electronic device may enter a state 820 from the state 810. The change in the posture and/or type of the electronic device may include an operation of restoring the type of the first display 140-1, in which the covered first display 140-1 is again unfolded as a result of rotation of multiple housings of the electronic device by the user. In response to entering the state 820 from the state 810, electronic device according to an embodiment may deactivate the second display 140-2 and may display a fifth screen related to the fourth screen within the first display 140-1, similarly to the state 730 in FIG. 7. The fifth screen may be related to the second application and may be produced based on the size and/or resolution of the first display 140-1. In the state 820, the electronic device according to an embodiment may display, together with the fifth screen, at least one of objects 732 and 734 for restoring display of the second sub region 320 in the state 710.

In response to receiving an input of selecting at least one of the objects 732 and 734 in the state 820, the electronic device according to an embodiment may switch from the state 820 to a state 830. Since the second application corresponding to the second screen that has been displayed in the second sub region 320 in the state 710 is being executed to display the fifth screen, the electronic device according to an embodiment may display only the third screen, among the second screen and the third screen that have been displayed in the second sub region 320, within the second sub region 320. In the state 830, the electronic device according to an embodiment may display the fifth screen that has been displayed within the first sub region 310 in the state 820, or may display a screen based on the second application.

When all applications corresponding to all screens (for example, second and third screens) that have been displayed in the second sub region 320 are executed, display of the objects 732 and 734 for restoring display of the second sub region 320 may be ceased. Referring to FIG. 8B, in a state 840 in which the second screen is displayed within the second sub region 320, the electronic device may receive an input of rotating multiple housings of the electronic device such that the first display 140-1 is covered. The state 840 in which a split screen is provided to the user may correspond to the states 410, 420, 430, 440, and 450 in FIG. 3 and FIG. 4C to FIG. 4E, the state 520 in FIG. 5, or the state 710 in FIG. 7 and FIG. 8A, for example. In response to receiving the input, the electronic device may switch from the state 840 to a state 850.

In the state 850, the user of the electronic device may execute a second application corresponding to the second screen. In response to an input performed by the user of the electronic device to restore the type of the first display 140-1 to the type in the state 840, in the state 850 in which the second application is executed, the electronic device may enter a state 860 from the state 850. Since all applications (that is, second applications) that have been executed based on the second sub region 320 in the state 840 are currently executed, the electronic device may display none of the objects 732 and 734 for restoring the split screen in the state 840 within the first display 140-1, in spite of entering the state 860.

As described with reference to FIG. 7 and FIG. 8A to FIG. 8B, the electronic according to various embodiments may display an object (for example, objects 732 and 734) for restoring the split screen that has been displayed within at least one display (for example, first display 140-1) in response to restoration of the posture and/or the type. Furthermore, in response to a designated input which is distinguished from restoration of the posture and/or type of the electronic device, and which is for entering a single screen from the split screen, the electronic device may display an object for restoring at least a part of the split screen.

Figure 9:
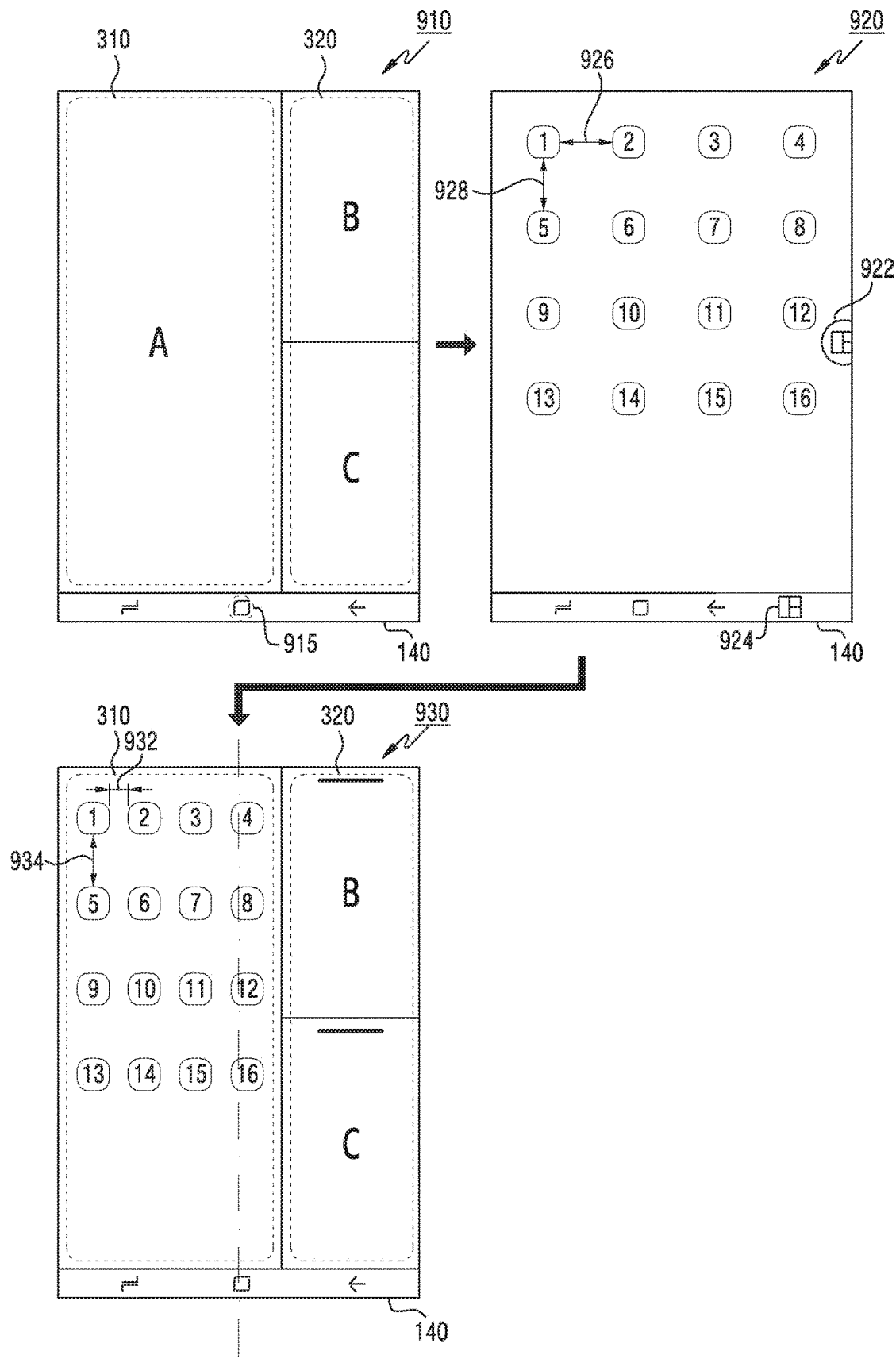
FIG. 9 illustrates an operation of an electronic device switching states according to a user input according to an embodiment of the disclosure.

FIG. 9 illustrates an operation of an electronic device switching a state thereof according to a user input according to an embodiment of the disclosure. The electronic device in FIG. 9 may correspond to the electronic device 101 in FIG. 1A to FIG. 1B and FIG. 2A to FIG. 2B. The display 140 in FIG. 9 may correspond to the display 140 in FIG. 1A and FIG. 2A or may correspond to at least one of the first display 140-1 or the second display 140-2 in FIG. 1B and FIG. 2B.

Referring to FIG. 9, the electronic device according to an embodiment may provide a split screen through the display 140 in a state 910. The state 910 may correspond to the states 410, 420, 430, 440, and 450 in FIG. 3 and FIG. 4C to FIG. 4E, the state 520 in FIG. 5, the state 710 in FIG. 7 and FIG. 8A, and the state 840 in FIG. 8B. Based on the state 910, the electronic device may display a first screen within the first sub region 310 and may display a second screen and a third screen within the second sub region 320. In the state 910, the electronic device may receive an input for displaying another screen (for example, the single screen) distinguished from the split screen. For example, the electronic device may receive an input of selecting an object 915 which is displayed within the second region, and which is for displaying a home screen provided based on the operating system.

In response to receiving an input of selecting the object 915, the electronic device according to an embodiment may enter a state 920 from the state 910. In the state 920, the electronic device according to an embodiment may display a home screen within at least a part (for example, the first region) of the display region of the display 140. Based on the home screen, the electronic device according to an embodiment may display multiple icons corresponding to multiple applications installed in the electronic device, respectively, within the display 140. The multiple icons may be disposed to be spaced apart from each other based on designated intervals 926 and 928 within the display 140.

In the state 920, the electronic device according to an embodiment may display at least one of objects 922 and 924 for restoring at least one of multiple screens that have been displayed in the state 910 within the display 140. The objects 922 and 924 may perform functions corresponding or similar to those of the objects 514 and 516 in FIG. 5 or the objects 732 and 734 in FIG. 7 and FIG. 8A to FIG. 8B. In response to an input of receiving at least one of the objects 922 and 924, the electronic device according to an embodiment may enter a state 930 from the state 920.

In the state 930, the electronic device according to an embodiment may split at least a part of the display region of the display 140 (for example, the first region and/or the entire display region) into a first sub region 310 and a second sub region 320. The electronic device may display at least one screen (second screen and/or third screen) that has been displayed within the second sub region 320 in the state 910, within the second sub region 320. For example, the electronic device may restore display of the second scree and/or the third screen. The electronic device may display a home screen that has been displayed in the state 920, within the first sub region 310.

Referring to FIG. 9, as the state of the electronic device switches from the state 920 to a state 930, the size of a part of the display 140, on which the home screen is displayed, may be reduced. In response to the reduction, the electronic device according to an embodiment may maintain the size of multiple icons on the home screen and may change the intervals 926 and 928 between the multiple icons, respectively, to intervals 932 and 934 based on the first sub region 310. In response to the reduction, the electronic device according to an embodiment may also adjust (for example, reduce) the size of multiple icons on the home screen based on the size of the first sub region 310. As respective intervals between the multiple icons are changed, the multiple icons may come close to each other, and the density of the multiple icons may increase. As the electronic device according to an embodiment changes respective intervals between the multiple icons, the electronic device may prevent at least some of the multiple icons that have been displayed on the home screen from being covered by the second sub region 320.

A change in the type of the electronic device may include not only a change (in-folding) made such that at least one display (for example, the first display 140-1 in FIG. 2B) included in the electronic device is not exposed to the outside, but also a change (out-folding) made such that a surface on which the at least one display is not disposed is not exposed to the outside. In an embodiment related to the out-folding, the electronic device may display an execution screen for restoring the split screen similarly to the above-mentioned operations. Hereinafter, an operation performed by the electronic device in an embodiment related to out-folding will be described with reference to FIG. 10.

Figure 10:
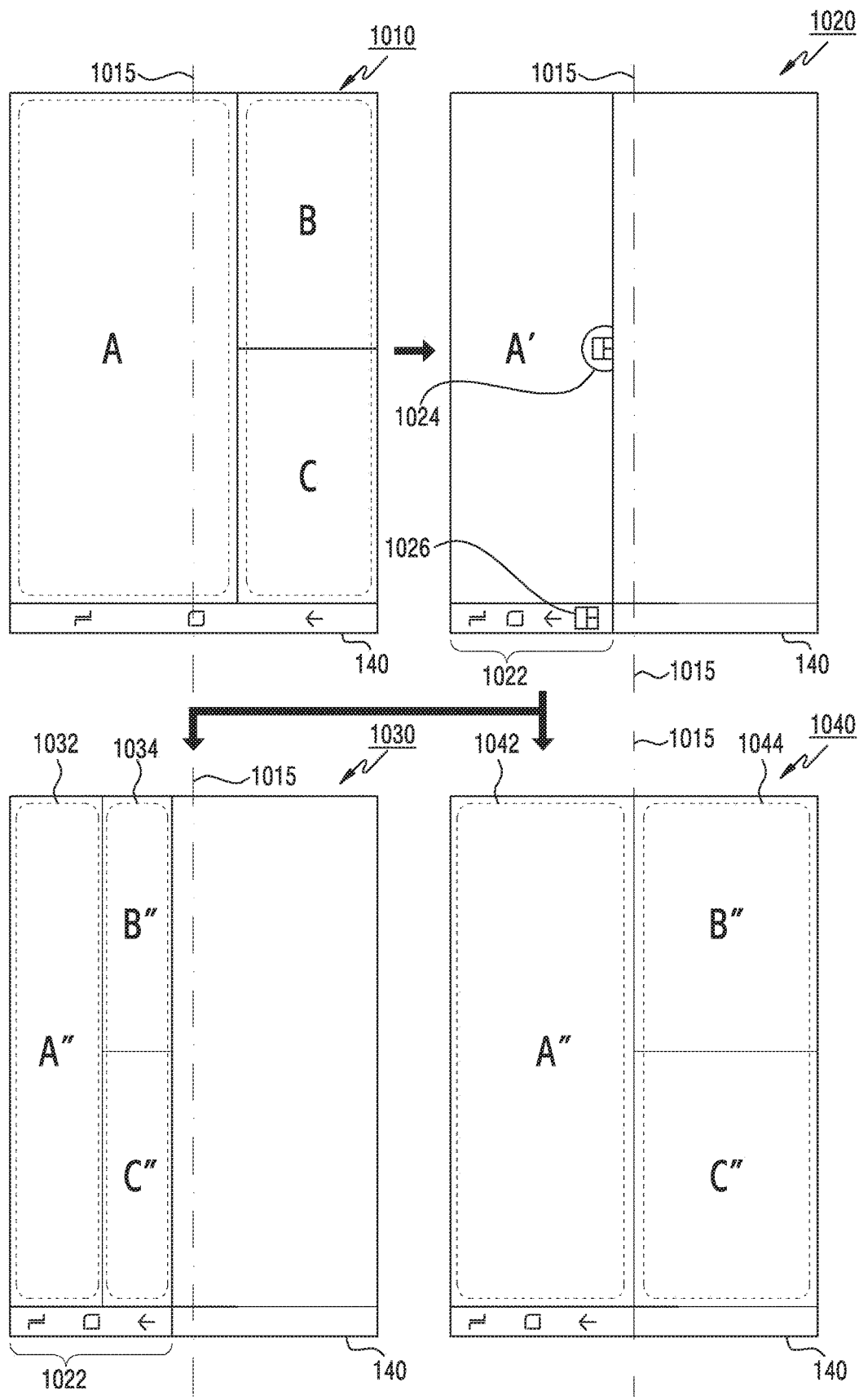
FIG. 10 illustrates an operation of an electronic device switching states according to a posture of the electronic device and/or a user input according to an embodiment of the disclosure.

FIG. 10 illustrates an operation of an electronic device switching a state according to a posture of the electronic device and/or a user input according to an embodiment of the disclosure. The electronic device in FIG. 10 may correspond to the electronic device 101 in FIG. 1A to FIG. 1B and FIG. 2A to FIG. 2B. For example, the display 140 in FIG. 10 may correspond to the display 140 in FIG. 1A and FIG. 2A or may correspond to at least one of the first display 140-1 or the second display 140-2 in FIG. 1B and FIG. 2B.

Referring to FIG. 10, in a state 1010, the electronic device according to an embodiment may display multiple screens within the display 140 based on a split screen. For example, the electronic device may display a first screen in the first sub region of the display 140 and may display at least one of a second screen or a third screen in the second sub region thereof. The state 1010 may correspond to the states 410, 420, 430, 440, and 450 in FIG. 3 and FIG. 4C to FIG. 4E, the state 520 in FIG. 5, the state 710 in FIG. 7 and FIG. 8A, the state 840 in FIG. 8B, and the state 910 in FIG. 9.

For example, in the state 1010 in which a split screen is displayed within the display 140, the user of the electronic device may perform a designated input of changing the posture and/or type of the electronic device. The designated input may include a user operation of bending or folding at least a part of the display 140 such that any part of the display 140 is not covered or hidden by the housing of the electronic device. For example, the designated input may correspond to an input of rotating multiple housings (for example, the first housing 210 and the second housing 220 in FIG. 2B) of the electronic device around a rotational axis 1015. In response to receiving the designated input, the electronic device according to an embodiment may enter a state 1020 from the state 1010.

In the state 1020, the electronic device according to an embodiment may display a fourth screen based on a single screen on a part 1022 of the display 140. In an embodiment of the disclosure, the fourth screen may be related to the first screen that has been displayed in the first region in the state 1010 (or the first application corresponding to the first screen). In an embodiment of the disclosure, the fourth screen may correspond to a designated screen provided by the operating system of the electronic device (for example, home screen).

The part 1022 on which the fourth screen is displayed may correspond to a part of the display 140 facing the user of the electronic device. For example, the part 1022 may be included in the other part of the display 140 than the part wound around the rotational axis 1015. For example, the part 1022 may correspond to a part of the display 140 unfolded toward the user. For example, the electronic device may identify the part 1022 of the display 140 facing the user of the electronic device, based on a grip sensor, a geomagnetic sensor, an iris sensor, and/or an image sensor for performing face recognition.

In the state 1020 in which the fourth screen is displayed, the electronic device according to an embodiment may display at least one of objects 1024 and 1026 for restoring at least a part of the split screen in the state 1010, within the display 140. In response to receiving an input of selecting at least one of the objects 1024 and 1026, the electronic device according to an embodiment may enter at least one of states 1030 and 1040 from the state 1020. In the state 1030, the electronic device according to an embodiment may split a part 1022 of the display 140 into a first sub region 1032 and a second sub region 1034. The electronic device may display a fifth screen related to the fourth screen that has been displayed in the state 1020 within the first sub region 1032. The electronic device may display at least one of the second screen or the third screen, which has been displayed in the state 1010, within the second sub region 1034.

In the state 1040, the electronic device according to an embodiment may split the entire display region of the display 140 into a first sub region 1042 and a second sub region 1044 with reference to the rotational axis 1015. The electronic device may display a fifth screen related to the fourth screen that has been displayed in the state 1020 within the first sub region 1042. The electronic device may display at least one of the second screen or the third screen, which has been displayed in the state 1010, within the second sub region 1044.

In an embodiment of the disclosure, the electronic device may perform an operation in response to an input of restoring the type of the display 140 similarly to the operation described with reference to FIG. 8A to FIG. 8B and FIG. 9. For example, in response to receiving an input of again unfolding the display 140 around the rotational axis 1015 in the state 1020, the electronic device may display at least one of the objects 1024 and 1026, while displaying a screen based on the fourth screen in the entire display region of the display 140. The position of the object 1024 may be changed from a position close to the rotational axis 1015 in the state 1020 to a position adjacent to the boundary of the display region.

Figure 11:
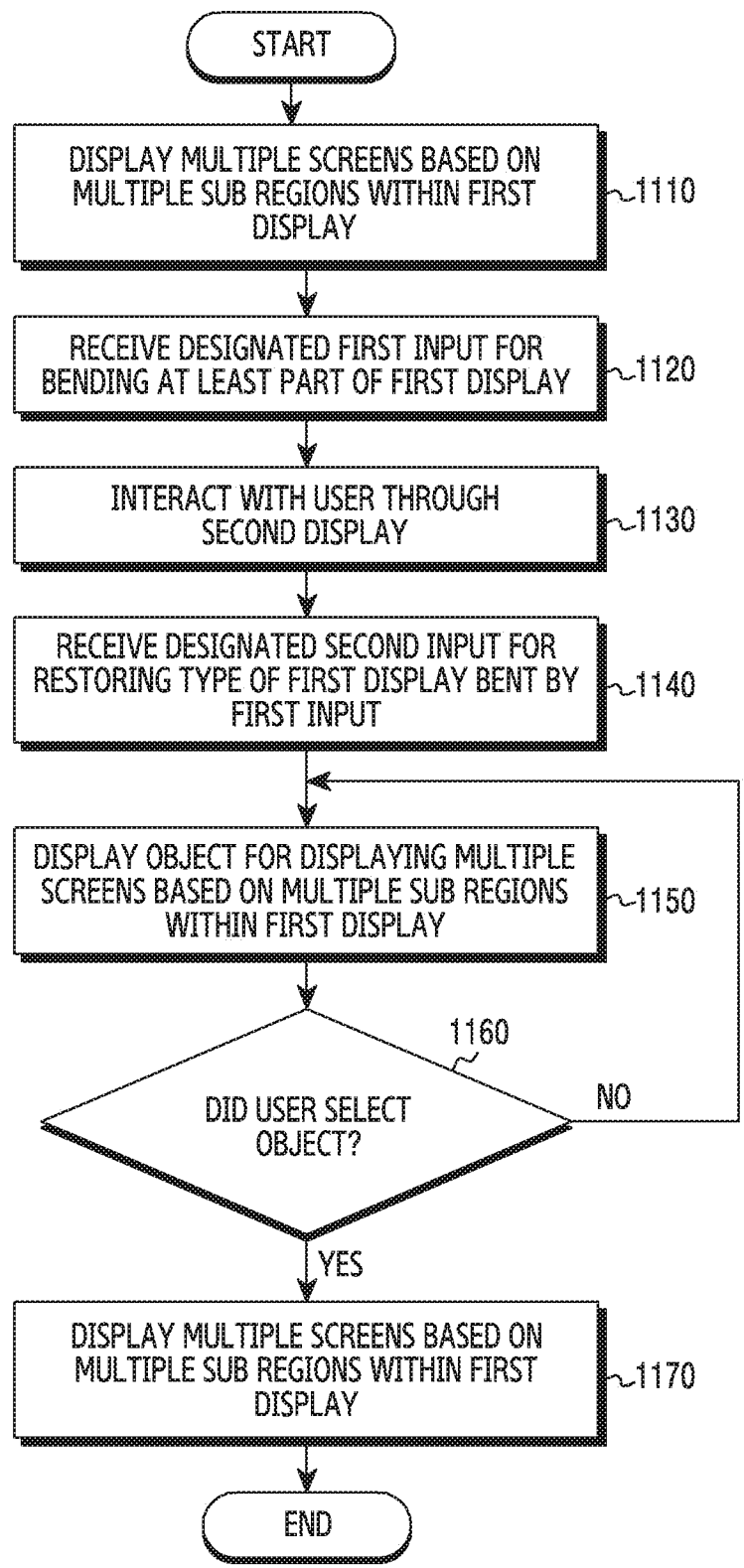
FIG. 11 is a flowchart illustrating operations of an electronic device according to an embodiment of the disclosure.

FIG. 11 is a flowchart illustrating operations of an electronic device according to an embodiment of the disclosure. The electronic device in FIG. 11 may correspond to the electronic device 101 in FIG. 1A to FIG. 1B. The operations in FIG. 11 may be performed by the electronic device 101 and/or the processor 120 in FIG. 1A to FIG. 1B.

Referring to FIG. 11, in operation 1110, the electronic device according to an embodiment may display multiple screens based on multiple sub regions within a first display. The first display may correspond to the first display 140-1 in FIG. 1B and FIG. 2B. The electronic device according to an embodiment may display multiple screens based on multiple sub regions including the first sub region 310 and the second sub region 320 in FIG. 3. For example, the electronic device may display at least a part of the first screen within the first sub region within the display region of the first display, and may display at least one of a second screen or a third screen within the second sub region, which is beside the first sub region within the display region. The first screen, the second screen, and the third screen may correspond to a first application, a second application, and a third application which are different from each other. The state in which the electronic device displays multiple screens based on operation 1110 may correspond to the states 410, 420, 430, 440, and 450 in FIG. 3 and FIG. 4C to FIG. 4E, the state 520 in FIG. 5, the state 710 in FIG. 7 and FIG. 8A, and the state 840 in FIG. 8B.

Referring to FIG. 11, in operation 1120, the electronic device according to an embodiment may receive a first input of bending at least a part of the first display. The first input may correspond to an input of rotating multiple housings (for example, the first housing 210 and the second housing 220 in FIG. 2B) of the electronic device around the folding part (for example, the folding part 230 in FIG. 2B) of the electronic device so as to contact portions of the first display, in a state in which multiple screens are displayed within the first display based on operation 1110.

The electronic device according to an embodiment may include a first display and a second display, and may include a GRAM operatively connected to the first display and the second display. In response to receiving a first input in operation 1120, the electronic device may remove first frame data which is stored in the GRAM, and which is for displaying multiple screens in operation 1110. Removal of the first frame data may be performed to prevent distortion that may occur when first frame data based on the first display is displayed within the second display, as will be described later.

Referring to FIG. 11, in operation 1130, the electronic device according to an embodiment may interact with the user through the second display. The second display may correspond to the second display 140-2 in FIG. 1B and FIG. 2B. For example, after receiving the first input in operation 1120, a designated input of activating the second display may be received. In response to receiving an input of activating the second display, the electronic device may display a fourth screen within the second display. The fourth screen may be a screen (for example, home screen based on the size and/or resolution of the second display) distinguished from multiple screens (first to third screens) in operation 1110. In response to receiving an input of activating the second display, the electronic device according to an embodiment may store second frame data for displaying the fourth screen within the second display, in the GRAM. Interaction with the user through the second display performed by the electronic device according to an embodiment based on operation 1130 may correspond to the state 720 in FIG. 7, the state 810 in FIG. 8A, and the state 850 in FIG. 8B.

Referring to FIG. 11, in operation 1140, the electronic device according to an embodiment may receive a designated second input for restoring the type of the first display that has been bent by a first input. In the state in which the fourth screen is displayed within the second display based on operation 1130, the electronic device may receive a designated second input for rotating multiple housings around the folding part to separate the contacted portions of the first display. In response to receiving the second input, the electronic device according to an embodiment may remove second frame data corresponding to the fourth screen, stored in the GRAM. After removing the second frame data, the electronic device according to an embodiment may store third frame data which is based on the size of the first display and the fourth screen displayed on the second display, and which corresponds to the fifth screen, within the GRAM.

In response to storing the third frame data within the GRAM, the electronic device according to an embodiment may control the first display based on the third frame data in order to display a fifth screen within the first display. Since the fifth screen is related to the fourth screen displayed on the second display, the user may continuously perform the operations, which have been performed on the second display before and after the second input, within the first display.

Referring to FIG. 11, in operation 1150, the electronic device according to an embodiment may display an object for displaying multiple screens based on multiple sub regions, within the first display. The object may correspond to a handler for restoring at least some of multiple screens that have been displayed within the first screen based in operation 1110. The object may correspond to the objects 512, 514, and 516 in FIG. 5 or the objects 732 and 734 in FIG. 7 and FIG. 8A, for example.

The state in which the electronic device displays an object based on operation 1150 may correspond to the state 510 in FIG. 5, the state 730 in FIG. 7, or the state 820 in FIG. 8A, for example. In response to receiving a second input in operation 1140, the electronic device may display a fifth screen at least partially related to the fourth screen displayed on the second display within the display region of the first display. The electronic device may display the object in a state in which the fifth screen is displayed.

Referring to FIG. 11, in operation 1160, the electronic device according to an embodiment may receive a user input for selecting the object in operation 1150. For example, the user input for selecting the object may include a gesture of dragging the object, which is displayed while being superimposed on at least a part of the fifth screen, by a designated distance or more. When the user has not selected the object (No in operation 1160), display of the object and the fifth screen may be maintained.

When the user has selected the object (Yes in operation 1160), the electronic device according to an embodiment may display multiple screens based on multiple sub regions, within the first display, in operation 1170. The state in which the electronic device displays multiple screens based on operation 1170 may correspond to the state 740 in FIG. 7 or the state 830 in FIG. 8A. In an embodiment of the disclosure, in response to receiving an input of selecting the object, the electronic device may display a fifth screen within the first sub region and may display at least one of the second screen or the third screen within the second sub region.

When the interaction in operation 1130 makes it unnecessary to display the second screen or the third screen within the second sub region, at least one of the second screen or the third screen may not be displayed within the second sub region, in spite of selection of the object in operation 1160. For example, in response to receiving the second input in operation 1140, the electronic device may identify at least one application executed by the interaction. When the application executed by the interaction includes an application that has been executed based on the second sub region in operation 1110, the electronic device may not display an execution screen corresponding to the application executed by the interaction within the second sub region, in spite of selection of the object in operation 1160. Alternatively, the electronic device may display an execution screen corresponding to the application executed by the interaction within the first sub region.

Figure 12:
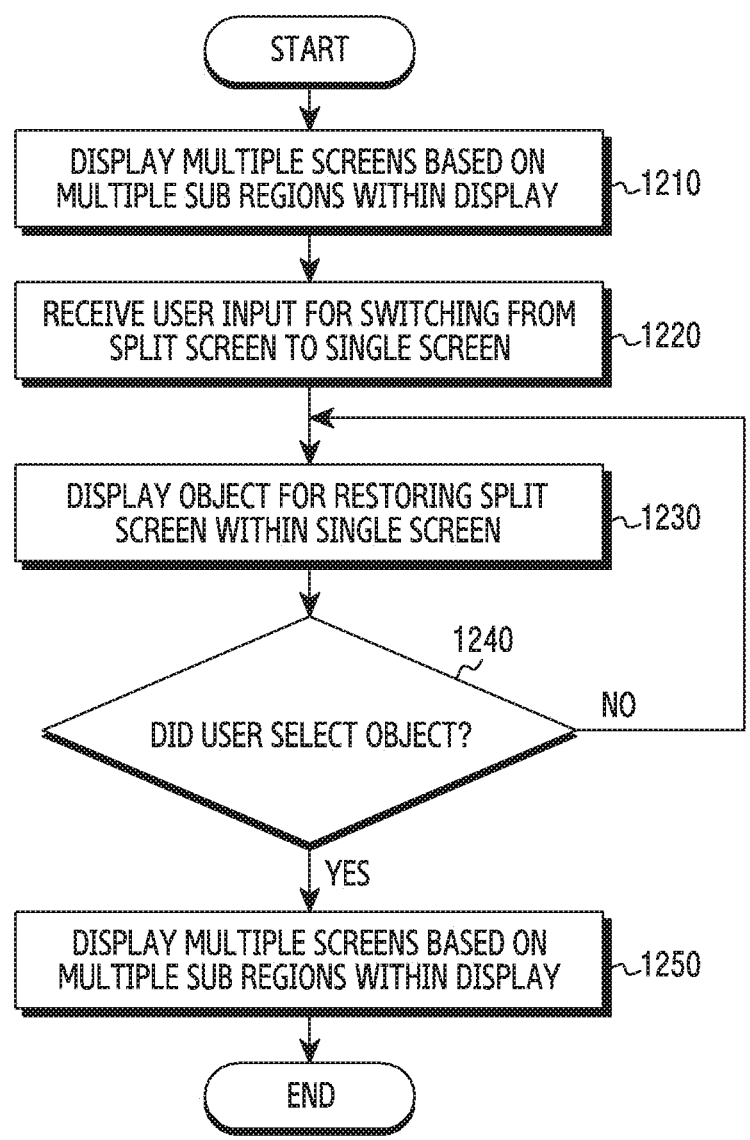
FIG. 12 is a flowchart illustrating operations of an electronic device according to an embodiment of the disclosure.

FIG. 12 is a flowchart illustrating operations of an electronic device according to an embodiment. The electronic device in FIG. 12 may correspond to the electronic device 101 in FIG. 1A to FIG. 1B. The operations in FIG. 12 may be performed by the electronic device 101 and/or the processor 120 in FIG. 1A to FIG. 1B.

Referring to FIG. 12, in operation 1210, the electronic device according to an embodiment may display multiple screens based on multiple sub regions within a display. For example, the electronic device may display at least a part of a first screen within a first sub region within the display region of the display, and may display at least one of a second screen or a third screen within a second sub region, which is beside the first sub region within the display region. The state in which the electronic device displays multiple screens based on operation 1210 may correspond to the states 410, 420, 430, 440, and 450 in FIG. 3 and FIG. 4C to FIG. 4E, the state 520 in FIG. 5, the state 710 in FIG. 7 and FIG. 8A, the state 840 in FIG. 8B, and the state 910 in FIG. 9.

Referring to FIG. 12, in operation 1220, the electronic device according to an embodiment may receive a user input for switching from the split screen to a single screen. The user input may include a designated gesture (for example, gesture of selecting the object 915 in FIG. 9) for calling the home screen. In response to receiving the user input, the electronic device according to an embodiment may display a fourth screen corresponding to the home screen. The fourth screen may correspond to at least a part of the display including all of multiple sub regions. The electronic device may display multiple icons for executing multiple applications stored in the memory, within the fourth screen. The multiple icons may be disposed to be spaced apart by a designated first distance (for example, distance 926 in FIG. 9) within the fourth screen.

Referring to FIG. 12, in operation 1230, the electronic device according to an embodiment may display an object for restoring the split screen in operation 1210 within the single screen. In response to receiving a user input in operation 1220, the electronic device according to an embodiment may display an object for restoring the second sub region that has been displayed in operation 1210 and the fourth screen, in the entire display region of the display. The object may correspond to at least one of the objects 922 and 924 in FIG. 9, for example.

In an embodiment of the disclosure, display of the object may be ceased based on interaction between the electronic device and the user, which is performed within the single screen. For example, the electronic device may receive another input performed within the fourth screen, while the fourth screen and the object are displayed in the entire display region. When all applications related to the second sub region in operation 1210 are executed by the other input, the electronic device according to an embodiment may cease to display the object based on operation 1230.

Referring to FIG. 12, in operation 1240, the electronic device according to an embodiment may receive an input of selecting the object. For example, the user input for selecting the object may include a gesture of dragging the object by a designated distance or more. When the user has not selected the object (No in operation 1240), display of the object and the fourth screen may be maintained. The state in which the electronic device displays the fourth screen and the object may correspond to the state 920 in FIG. 9.

When the user has selected the object (Yes in operation 1240), the electronic device according to an embodiment may display multiple screens based on multiple sub regions, within the display, in operation 1250. In response to receiving an input of selecting the object in operation 1230, the electronic device may display a fifth screen based on the fourth screen within the first sub region within the display region of the display, and may display the second screen or the third screen within the second sub region within the display region. The state in which the electronic device displays multiple screens based on operation 1250 may correspond to the state 930 in FIG. 9, for example.

In response to receiving an input of selecting the object in operation 1240, which has been received while the fourth screen is displayed, the electronic device may display a fifth screen, which includes at least some of the multiple icons, within the first sub region. At least some of the multiple icons displayed within the fifth screen may be disposed to be spaced apart by a designated second distance (for example, the distance 932 in FIG. 9) less than the first distance.

An electronic device according to various embodiments may include a first housing including a first surface and a second surface faced away from the first surface, a second housing including a third surface and a fourth surface faced away from the third surface, a first display including a folding part rotatably connecting a side surface of the first housing and a side surface of the second housing facing the side surface of the first housing, the first display being disposed on the first surface and the third surface across the folding part, a second display disposed on the second surface of the first housing, at least one memory storing instructions, and at least one processor. The at least one processor may be configured, when the instructions are executed, to display at least a part of a first screen within a first sub region within a display region of the first display and display at least one of a second screen or a third screen within a second sub region beside the first sub region within the display region, receive a designated first input of rotating the first housing and the second housing around the folding part to contact portions of the first display, while displaying at least a part of the first screen within the first sub region and displaying at least one of the second screen or the third screen within the second sub region, display a fourth screen within the second display, in response to receiving a designated second input of activating the second display, after receiving the first input, receive a designated third input of rotating the first housing and the second housing around the folding part to separate the contacted portions of the first display, while displaying the fourth screen within the second display, display a fifth screen at least partially related to the fourth screen displayed on the second display, within the display region of the first display, in response to receiving the third input, and display an object for displaying the second sub region including at least one of the second screen or the third screen, while displaying the fifth screen.

In an embodiment of the disclosure, the at least one processor may be configured, when the instructions are executed, to display a fifth screen within the first sub region, in response to receiving a designated fourth input of selecting the object, and display at least one of the second screen or the third screen within the second sub region, while displaying the fifth screen within the first sub region.

In an embodiment of the disclosure, the at least one processor may be configured, when the instructions are executed, to receive the fourth input, based on a gesture of dragging the object displayed to be superimposed on at least a part of the fifth screen, by at least a designated distance.

In an embodiment of the disclosure, the at least one memory may include a graphic random access memory (GRAM) operatively connected to the first display and the second display. The at least one processor may be configured, when the instructions are executed, to remove first frame data which is stored in the GRAM, and which is for displaying at least one of the first screen, the second screen, or the third screen within the display region of the first display, in response to receiving the first input, and store second frame data for displaying the fourth screen within the second display within the GRAM, in response to receiving the second input.

In an embodiment of the disclosure, the at least one processor may be configured, when the instructions are executed, to store third frame data which is based on the size of the first display and the fourth screen displayed on the second display, and which corresponds to the fifth screen, within the GRAM, in response to receiving the third input, and control the first display based on the third frame data to display the fifth screen within the first display, in response to storing the third frame data within the GRAM.

In an embodiment of the disclosure, the at least one processor may be configured, when the instructions are executed, to identify at least one application executed based on the second display activated by the second input, in response to receiving the third input, and display the fifth screen without the object, in response to identifying that all applications executed to display the second sub region were executed based on the activated second display.

In an embodiment of the disclosure, the at least one processor may be configured, when the instructions are executed, to receive the first input while displaying all of the second screen and the third screen within the second sub region, display the fourth screen within the second display based an application executed to display the second screen within the second sub region, while activating the second display in response to the second input received after the first input, display the fifth screen within the display region of the first display based on the application, in response to receiving the third input received after the second input, and display the third screen in the entire second sub region, in response to receiving a designated fourth input of selecting the object.

In an embodiment of the disclosure, the at least one processor may be configured, when the instructions are executed, to execute multiple applications stored in the at least one memory, thereby displaying the first screen within the first sub region and displaying at least one of the second screen or the third screen within the second sub region. The first screen, the second screen, and the third screen may correspond to applications distinguished from each other, among the multiple applications.

An electronic device according to various embodiments may include a display, at least one memory storing instructions, and at least one processor. The at least one processor may be configured, when the instructions are executed, to display at least a part of a first screen within a first sub region within a display region of the display and display at least one of a second screen or a third screen within a second sub region beside the first sub region within the display region, receive a designated first input while displaying at least a part of the first screen within the first sub region and displaying at least one of the second screen or the third screen within the second sub region, display an object for displaying the second sub region and a fourth screen distinguished from the first screen, the second screen, and the third screen in the entire display region, in response to receiving the first input, and display a fifth screen based on the fourth screen within the first sub region and display the second screen or the third screen within the second sub region, in response to receiving a designated second input of selecting the object.

In an embodiment of the disclosure, the at least one processor may be configured, when the instructions are executed, to receive the second input, based on a gesture of dragging the object displayed to be superimposed on at least a part of the fourth screen, by at least a designated distance.

In an embodiment of the disclosure, the at least one processor may be configured, when the instructions are executed, to display the fourth screen including multiple icons for executing multiple applications stored in the memory, in response to receiving the first input, the multiple icons being disposed to be spaced apart by a designated first distance in the entire display region, and display the fifth screen including at least some of the multiple icons within the first sub region, in response to the second input received while displaying the fourth screen. At least some of the multiple icons displayed within the fifth screen may be disposed to be spaced apart by a designated second distance that is smaller than the first distance.

In an embodiment of the disclosure, the at least one processor may be configured, when the instructions are executed, to display the fourth screen corresponding to a home screen together with the object, in response to receiving the first input for calling the home screen.

In an embodiment of the disclosure, the at least one processor may be configured, when the instructions are executed, to receive a different input performed within the fourth screen, while displaying the fourth screen and the object in the entire display region, and cease to display the object within the display region, in response to identifying that all applications executed to display the second sub region are executed by the different input.

In an embodiment of the disclosure, the at least one processor may be configured, when the instructions are executed, to receive the first input while displaying all of the second screen and the third screen within the second sub region, display a different screen corresponding to an application executed to display the second screen within the fourth screen, in response to a different input of selecting the application, in the entire display region, and display the different screen within the first sub region and display the third screen in the entire second sub region, in response to receiving the second input after displaying the different screen.

A method of an electronic device according to various embodiments may include displaying at least a part of a first screen within a first sub region within a display region of a first display of the electronic device, displaying at least one of a second screen or a third screen within a second sub region beside the first sub region while displaying at least a part of the first screen within the first sub region, receiving a designated first input of rotating a first housing and a second housing of the electronic device around a folding part of the electronic device to contact portions of the first display, while displaying at least a part of the first screen within the first sub region and displaying at least one of the second screen or the third screen within the second sub region, displaying a fourth screen within the second display, in response to receiving a designated second input of activating the second display of the electronic device, after receiving the first input, receiving a designated third input of rotating the first housing and the second housing around the folding part to separate the contacted portions of the first display, while displaying the fourth screen within the second display, displaying a fifth screen at least partially related to the fourth screen displayed within the second display, within the display region of the first display, in response to receiving the third input, and displaying an object for displaying the second sub region including at least one of the second screen or the third screen, while displaying the fifth screen.

The method of an electronic device according to an embodiment may further include displaying a fifth screen within the first sub region, in response to receiving a designated fourth input of selecting the object, and displaying at least one of the second screen or the third screen within the second sub region, while displaying the fifth screen within the first sub region.

The method of an electronic device according to an embodiment may further include an operation of receiving the fourth input, based on a gesture of dragging the object displayed to be superimposed on at least a part of the fifth screen, by at least a designated distance.

In an embodiment of the disclosure, the operation of displaying a fourth screen may include removing first frame data which is stored in a GRAM of the electronic device, and which is for displaying at least one of the first screen, the second screen, or the third screen within the display region of the first display, in response to receiving the first input, and storing second frame data for displaying the fourth screen within the second display within the GRAM, in response to receiving the second input.

In an embodiment of the disclosure, the operation of displaying a fifth screen may further include storing third frame data which is based on the size of the first display and the fourth screen displayed on the second display, and which corresponds to the fifth screen, within the GRAM, in response to receiving the third input, and controlling the first display based on the third frame data to display the fifth screen within the first display, in response to storing the third frame data within the GRAM.

The method of an electronic device according to an embodiment may further include identifying at least one application executed based on the second display activated by the second input, in response to receiving the third input, and displaying the fifth screen without the object, in response to identifying that all applications executed to display the second sub region were executed based on the activated second display.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been described with reference to various embodiment thereof, it will be understood by those skilled in the art that various changes in form and details may be made therein without departing from the spirit and scope of the disclosure as defined by the appended claims and equivalents.

What is claimed is:

1. An electronic device comprising:
    a first housing comprising a first surface and a second surface faced away from the first surface;
    a second housing comprising a third surface and a fourth surface faced away from the third surface;
    a first display comprising a folding part rotatably connecting a side surface of the first housing and a side surface of the second housing facing the side surface of the first housing, the first display being disposed on the first surface and the third surface across the folding part;
a second display disposed on the second surface of the first housing;
at least one memory configured to store instructions; and
at least one processor configured to, when the instructions are executed, to:
display at least a part of a first screen within a first sub region within a display region of the first display and display at least one of a second screen or a third screen within a second sub region beside the first sub region within the display region,
receive a designated first input of rotating the first housing and the second housing around the folding part to contact portions of the first display, while displaying at least a part of the first screen within the first sub region and displaying at least one of the second screen or the third screen within the second sub region,
display a fourth screen within the second display, in response to receiving a designated second input of activating the second display, after receiving the first input,
receive a designated third input of rotating the first housing and the second housing around the folding part to separate the contacted portions of the first display, while displaying the fourth screen within the second display,
display a fifth screen at least partially related to the fourth screen displayed on the second display, within the display region of the first display, in response to receiving the third input, and
display an object for displaying the second sub region comprising at least one of the second screen or the third screen, while displaying the fifth screen.

2. The electronic device of claim 1, wherein the at least one processor is further configured to:
display a fifth screen within the first sub region, in response to receiving a designated fourth input of selecting the object, and
display at least one of the second screen or the third screen within the second sub region, while displaying the fifth screen within the first sub region.

3. The electronic device of claim 2, wherein the at least one processor is further configured to receive the fourth input, based on a gesture of dragging the object displayed to be superimposed on at least a part of the fifth screen, by at least a designated distance.

4. The electronic device of claim 1,
wherein the at least one memory comprises a graphic random access memory (GRAM) operatively connected to the first display and the second display, and
wherein the at least one processor is further configured to:
remove first frame data which is stored in the GRAM, and which is for displaying at least one of the first screen, the second screen, or the third screen within the display region of the first display, in response to receiving the first input, and
store second frame data for displaying the fourth screen within the second display within the GRAM, in response to receiving the second input.

5. The electronic device of claim 4, wherein the at least one processor is further configured to:
store third frame data which is based on the size of the first display and the fourth screen displayed on the second display, and which corresponds to the fifth screen, within the GRAM, in response to receiving the third input, and
control the first display based on the third frame data to display the fifth screen within the first display, in response to storing the third frame data within the GRAM.

6. The electronic device of claim 1, wherein the at least one processor is further configured to:
identify at least one application executed based on the second display activated by the second input, in response to receiving the third input, and
display the fifth screen without the object, in response to identifying that all applications executed to display the second sub region were executed based on the activated second display.

7. The electronic device of claim 1, wherein the at least one processor is further configured to:
receive the first input while displaying all of the second screen and the third screen within the second sub region,
display the fourth screen within the second display based an application executed to display the second screen within the second sub region, while activating the second display in response to the second input received after the first input,
display the fifth screen within the display region of the first display based on the application, in response to receiving the third input received after the second input, and
display the third screen in the entire second sub region, in response to receiving a designated fourth input of selecting the object.

8. The electronic device of claim 1,
wherein the at least one processor is further configured to execute multiple applications stored in the at least one memory, thereby displaying the first screen within the first sub region and displaying at least one of the second screen or the third screen within the second sub region, and
wherein the first screen, the second screen, and the third screen correspond to applications distinguished from each other, among the multiple applications.

9. An electronic device comprising:
a display;
at least one memory configured to store instructions; and
at least one processor configured, when the instructions are executed, to:
display at least a part of a first screen within a first sub region within a display region of the display and display at least one of a second screen or a third screen within a second sub region beside the first sub region within the display region,
receive a designated first input while displaying at least a part of the first screen within the first sub region and displaying at least one of the second screen or the third screen within the second sub region,
display an object for displaying the second sub region and a fourth screen distinguished from the first screen, the second screen, and the third screen in the entire display region, in response to receiving the first input, and
display a fifth screen based on the fourth screen within the first sub region and display the second screen or the third screen within the second sub region, in response to receiving a designated second input of selecting the object.

10. The electronic device of claim 9, wherein the at least one processor is further configured to receive the second input, based on a gesture of dragging the object displayed to be superimposed on at least a part of the fourth screen, by at least a designated distance.

11. The electronic device of claim 9,
wherein the at least one processor is further configured to:
 display the fourth screen comprising multiple icons for executing multiple applications stored in the at least one memory, in response to receiving the first input, the multiple icons being disposed to be spaced apart by a designated first distance in the entire display region, and
 display the fifth screen comprising at least some of the multiple icons within the first sub region, in response to the second input received while displaying the fourth screen, and
wherein at least some of the multiple icons displayed within the fifth screen are disposed to be spaced apart by a designated second distance that is smaller than the first distance.

12. The electronic device of claim 9, wherein the at least one processor is further configured to display the fourth screen corresponding to a home screen together with the object, in response to receiving the first input for calling the home screen.

13. The electronic device of claim 9, wherein the at least one processor is further configured to:
 receive a different input performed within the fourth screen, while displaying the fourth screen and the object in the entire display region, and
 cease to display the object within the display region, in response to identifying that all applications executed to display the second sub region are executed by the different input.

14. The electronic device of claim 9, wherein the at least one processor is further configured to:
 receive the first input while displaying all of the second screen and the third screen within the second sub region,
 display a different screen corresponding to an application executed to display the second screen within the fourth screen, in response to a different input of selecting the application, in the entire display region, and
 display the different screen within the first sub region and display the third screen in the entire second sub region, in response to receiving the second input after displaying the different screen.

15. A method of an electronic device, the method comprising:
 displaying at least a part of a first screen within a first sub region within a display region of a first display of the electronic device;
 displaying at least one of a second screen or a third screen within a second sub region beside the first sub region while displaying at least a part of the first screen within the first sub region;
 receiving a designated first input of rotating a first housing and a second housing of the electronic device around a folding part of the electronic device to contact portions of the first display, while displaying at least a part of the first screen within the first sub region and displaying at least one of the second screen or the third screen within the second sub region;
 displaying a fourth screen within the second display, in response to receiving a designated second input of activating the second display of the electronic device, after receiving the first input;
 receiving a designated third input of rotating the first housing and the second housing around the folding part to separate the contacted portions of the first display, while displaying the fourth screen within the second display;
 displaying a fifth screen at least partially related to the fourth screen displayed within the second display, within the display region of the first display, in response to receiving the third input; and
 displaying an object for displaying the second sub region comprising at least one of the second screen or the third screen, while displaying the fifth screen.

16. The method of claim 15, further comprising:
 displaying a fifth screen within the first sub region, in response to receiving a designated fourth input of selecting the object; and
 displaying at least one of the second screen or the third screen within the second sub region, while displaying the fifth screen within the first sub region.

17. The method of claim 16, further comprising:
 receiving the fourth input, based on a gesture of dragging the object displayed to be superimposed on at least a part of the fifth screen, by at least a designated distance.

18. The method of claim 15, wherein the displaying a fourth screen comprises:
 removing first frame data which is stored in a GRAM of the electronic device, and which is for displaying at least one of the first screen, the second screen, or the third screen within the display region of the first display, in response to receiving the first input; and
 storing second frame data for displaying the fourth screen within the second display within the GRAM, in response to receiving the second input.

19. The method of claim 18, wherein displaying a fifth screen further comprises:
 storing third frame data which is based on the size of the first display and the fourth screen displayed on the second display, and which corresponds to the fifth screen, within the GRAM, in response to receiving the third input; and
 controlling the first display based on the third frame data to display the fifth screen within the first display, in response to storing the third frame data within the GRAM.

20. The method of claim 15, further comprising:
 identifying at least one application executed based on the second display activated by the second input, in response to receiving the third input; and
 displaying the fifth screen without the object, in response to identifying that all applications executed to display the second sub region were executed based on the activated second display.

* * * * *